United States Patent
Peng

(10) Patent No.: US 8,394,272 B2
(45) Date of Patent: Mar. 12, 2013

(54) METHOD FOR REMOVING THE CONTAMINATION OF C,N UTILIZING HETEROTROPHIC AMMONIA-OXIDIZING BACTERIA

(76) Inventor: Guanghao Peng, Jiangsu (CN)

(*) Notice: Subject to any disclaimer, the term of this patent is extended or adjusted under 35 U.S.C. 154(b) by 350 days.

(21) Appl. No.: 12/667,381

(22) PCT Filed: Aug. 8, 2007

(86) PCT No.: PCT/CN2007/002386
§ 371 (c)(1),
(2), (4) Date: Jun. 15, 2010

(87) PCT Pub. No.: WO2009/018686
PCT Pub. Date: Feb. 12, 2009

(65) Prior Publication Data
US 2010/0314311 A1    Dec. 16, 2010

(51) Int. Cl.
C02F 3/30    (2006.01)

(52) U.S. Cl. ........ 210/605; 210/615; 210/617; 210/630; 210/903

(58) Field of Classification Search .......... 210/605, 210/615, 616, 617, 630, 631, 903
See application file for complete search history.

(56) References Cited

U.S. PATENT DOCUMENTS

| | | | |
|---|---|---|---|
| 7,008,538 B2* | 3/2006 | Kasparian et al. | 210/610 |
| 7,022,233 B2* | 4/2006 | Chen | 210/605 |
| 2010/0163482 A1* | 7/2010 | Chang et al. | 210/605 |
| 2010/0200496 A1* | 8/2010 | Graveleau | 210/605 |

FOREIGN PATENT DOCUMENTS

| | | |
|---|---|---|
| CN | 1310692 A | 8/2001 |
| CN | 1434118 A | 8/2003 |
| CN | 1483813 A | 3/2004 |
| CN | 1187440 C | 2/2005 |
| CN | 1590532 A | 3/2005 |

(Continued)

OTHER PUBLICATIONS

Ye Weiqing, "Experimental Methods for Soil Microorganism", Research Center for Soil Microorganism (Japan), Science Press, 14 pgs., (1983).

(Continued)

*Primary Examiner* — Fred Prince
(74) *Attorney, Agent, or Firm* — Blakely, Sokoloff, Taylor & Zafman LLP

(57) ABSTRACT

This invention relates to a method that uses heterothrophic ammonia oxidation bacteria (HAOB) to remove carbon and nitrogen pollutants in wastewater. The method includes the cultivation of the heterotropic bacteria in an activated sludge environment and the removal of carbon and nitrogen from the wastewater. According to the physiological characteristics of HAOB and the principles of combined oxidation of carbon and nitrogen, the method is able to achieve simultaneous removal of carbon and nitrogen under the condition that the cells do not grow. The process is able to be carried out in the temperature range of 6-40° C. No excess sludge is produced in the process. The invention is able to control the process and product composition of anaerobic ammonia oxidation through the control of organic carbon source, and is able to realize zero-accumulation of $NO_3^-N$ in the nitrification process. The invention can fully utilize existing activated sludge systems to remove carbon and nitrogen. Therefore there is no need to build new facilities, and all carbon and nitrogen removal processes can be finished in a single reactor.

16 Claims, 3 Drawing Sheets

FOREIGN PATENT DOCUMENTS

| | | | |
|---|---|---|---|
| CN | 1603248 | A | 4/2005 |
| CN | 1626464 | A | 6/2005 |
| EP | 0 826 639 | A1 | 3/1998 |
| JP | 2002361285 | A | 12/2002 |

OTHER PUBLICATIONS

Xu Guanghui, "Manual for Research Methods of Soil Microorganism", Beijing Agricultural Press, 24 pgs., (1986).

"Research Methods for Soil Microorganism", Institute of Soil Science, Chinese Academy of Sciences, Science Press, 3 pgs., (1985).

Chen IV-AN, "Research Methods for Water Quality", Japanese Industrial Water Usage Association Chinese Environmental Science Press, 32 pgs., (1990).

Wang Yiming, et al., "Advance in Molecular Biology of Heterotrophic Nitrifier", Soils, vol. 35, No. 5, ISSN 0253-9829, pp. 378-386 and 407, (Oct. 2003).

Jia-Qi Shen, et al., "Removal of $NH_3$-N by Microbe without Organic Carbon Source under Oxygen Limited Condition", Microbiology, vol. 33, No. 1, ISSN 0253-2654, pp. 94-99, (Feb. 2006).

Jing-Ping Zhu, et al., "Main Reactions in Anaerobic Ammonium Oxidation Reactor under Organic Carbon Condition", Environmental Science, vol. 27, No. 7, ISSN 0250-3301, pp. 1353-1357, (Jul. 2006).

Lei Qin, et al., "Aerobic Granulation for Organic Carbon and Nitrogen Removal in Alternating Aerobic-Anaerobic Sequencing Batch Reactor", Chemosphere, vol. 63, No. 6, pp. 926-933, (May 1, 2006).

Hung-Soo Joo, et al., "Piggery Wastewater Treatment using *Alcaligenes faecalis* strain No. 4 with Heterotrophic Nitrification and Aerobic Denitrification", Water Research, vol. 40, No. 16, pp. 3029-3036, (Sep. 1, 2009).

Extended European Search Report for European Application No. 07800689.7 containing Communication relating to the Results of the Supplementary European Search Report, 3 pgs., (Jun. 16, 2010).

PCT International Search Report for PCT Counterpart Application No. PCT/CN2007/002386 containing Communication relating to the Results of the Partial International Search Report, 8 pgs., (May 22, 2008).

\* cited by examiner

METHOD FOR REMOVING THE CONTAMINATION OF C,N UTILIZING HETEROTROPHIC AMMONIA-OXIDIZING BACTERIA

CROSS REFERENCE TO RELATED APPLICATION

This patent application is a U.S. National Phase application under 35 U.S.C. §371 of International Application No. PCT/CN2007/002386, filed on Aug. 8, 2007, entitled A METHOD FOR REMOVING THE CONTAMINATION OF C,N UTILIZING HETEROTROPHIC AMMONIA-OXIDIZING BACTERIA.

TECHNICAL FIELD

The present invention relates to a wastewater treatment method, in particular, a biological process to remove contaminant of carbon and nitrogen from wastewater.

BACKGROUND

Oxygen-consumption contaminants and nutritious substances present in the water, such as various organic carbon (C), nitrogen (N) and phosphorus (P), are the main pollutants causing deterioration of natural water quality. The most widely used method for organic carbon (COD or BOD) removal is the activated sludge process, i.e., secondary biological wastewater treatment process, which was invented between 1898 and 1914. The removal efficiency of organic carbon reaches 90-95%. In this biological treatment process, organic substances are oxidized and decomposed by heterotrophs. Part of the carbon, nitrogen, phosphorus and sulfur are assimilated to bacterial cells and are discharged in the form of excess sludge; the remaining organic carbon is oxidized to $CO_2$ by dissimilation and then removed. The energy produced in the process is required by the growth and metabolism of the heterotrophs. The rest of the inorganic substances such as nitrogen, phosphorus and sulfur are discharged along with the water in the form of $NH_3$, $NO_2^-$, $NO_3^-$, $PO_4^{3-}$, $SO_4^{2-}$ etc.

Conventional biological methods aiming at removing organic carbon (COD) are insufficient for ammonia removal. The ratio of carbon, nitrogen and phosphorus in the effluent of traditional secondary treatment process is approximately C(BOD):N:P=10:20:1. Therefore the process is able to remove 90% of BOD, but only about 20%-30% of nitrogen. The 70%-80% soluble nitrogen remained in wastewater is one of the causative factors of eutrophication.

It has been commonly recognized that the threats of ammonia to the water ecosystem are just second to organic carbon. And even though large municipal wastewater treatment facilities have been constructed and operated to remove organic carbon, the contamination of ammonia still causes a problem.

The biological method has already been proved to be effective for organic carbon removal, but how to remove nitrogen efficiently and economically in large scale still need to be investigated.

Conventional wastewater treatment technologies for removing organic carbon and nitrogen are based on the microbiological theory and technological principles that combine three processes: degradation of organic carbon and "ammonification" of organic nitrogen by heterotrophs, "nitrification" of ammonia and nitrite carried out by autotrophs, and "denitrification" by anaerobic (facultative) heterotrophs. The three processes above can be demonstrated as follows:

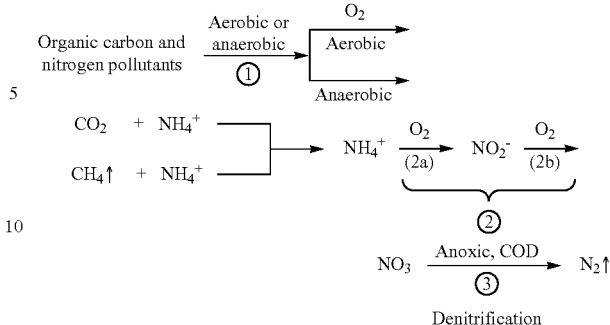

Some main features of the three steps are listed as follow:
①Ammonification is facilitated by the growth of heterotrophs of various genera in which organic nitrogen is converted to inorganic nitrogen, i.e. ammonia;
②Nitrification is facilitated by the growth of obligate aerobic autotrophs of various genera in which ammonia is oxidized to nitrite and nitrite is further oxidized to nitrate; Nitrosomonas and Nitrobacter are typical of these chemolithotrophic species that carry out the two oxidation processes, respectively.
③Denitrification is facilitated by the growth of heterotrophs of various genera in which nitrate is reduced to nitrogen gas.

Therefore, from the microbiological point, the mechanism of nitrogen and carbon removal follows a model as heterotrophic bacterial utilization→autotrophic bacterial utilization→heterotrophic bacterial utilization.

From a nitrogen removal perspective, the conventional activated sludge system in which organic substances removal and ammonification take place in the same reactor, can be considered as a single-stage nitrification process. According to the above model, nitrification is facilitated by the growth of autotrophs, and denitrification is facilitated by the growth of heterotrophs. In this single-stage nitrification process, the growth rate and the oxygen and nutrient utilization rate of the heterotrophs involved in oxidizing organic carbon are greater than the nitrifying autotrophs, therefore the heterotrophs predominate over the autotrophs, which ultimately leads to low efficient nitrification.

The phenomenon of low efficient nitrification is often observed in the secondary treatment process, which seemingly strengthens the fact that nitrifying bacteria is indeed autotrophic in nature. Researchers undoubtedly believe that organic substances inhibit the growth and physiological activity of autotrophic ammonia oxidizing bacteria in the waste water treatment system aiming at the removal of C and N pollutants.

Owing to this theory, two-stage and multistage activated sludge treatment processes are brought forth in order to eliminate the adverse effects of organic substances on nitrification by separating organic removal process and nitrification (and denitrification) in two (or three) separated reactors. However, the multistage activated sludge treatment processes have failed to achieve wide application due to its high investment and operation cost.

It is therefore understandable that before the breakthrough of theory, engineers and designers have conceived of a range of improved single-stage activated sludge technologies to remove nitrogen. These processes combine the aerobic nitrification zone and the anoxic denitrification zone into a single system such as PHOREDOX (A/O), $A^2$/O, UCT (or MUCT)

and VIP etc. However, the operations of these systems are still complicated although they have improved carbon and nitrogen removal.

Organic carbon and nitrogen removal efficiency is to the root constrained by the biological features of bacteria during nitrification. Since the operation of the wastewater treatment plants is under the guidance of metabolism theory of autotrophic nitrification, major drawbacks exit in the application of these conventional methods: ① Slow cell growth rate, low sludge production and poor sludge settleability of nitrifying bacteria make it difficult to maintain a high biomass concentration of nitrifying bacteria; ② Many activated sludge systems lack effective nitrification, especially during the winter when temperature drops below 15° C., which results in long hydraulic retention time (HRT) and low organic burden on the system; ③ Part of the effluent and sludge have to be returned to the tank to achieve higher biomass concentration and more effective nitrogen removal; ④ The addition of alkaline to maintain pH level leads to higher operation costs; ⑤ Conventional nitrification processes tend to have extreme results: either no ammonia oxidation at all or complete oxidation into nitrate; ⑥ Conventional methods are often inadequate for nitrogen-enriched waters with nitrogen content exceeding 200 mg/l.

In all, traditional nitrification-denitrification method is inadequate to prevent nitrogen pollution to the environment.

However, extensive and intensive studies on biological N-removal have been carried out in many developed countries, and lead to the breakthrough in both theory and technology which leads to the invention of a range of innovative nitrogen removal techniques with SHARON® as a representative, and has to some extent improved nitrogen removal efficiency and reduced operation costs in wastewater treatment.

Take the SHARON® (Single Reactor High Activity Ammonia Removal Over Nitrite) which is also considered a short-cut nitrification and denitrification technique (European patent EP 0 826 639 $A_1$, Chinese patent application publication No. CN1310692A) as an example:

Conventional nitrification methods completely oxidize ammonia to nitrate instead of nitrite ($NH_4^+ \rightarrow NO_2^- \rightarrow NO_3^-$, termed as "complete nitrification") in order to both eliminate the oxygen consumption potential of nitrogen and prevent nitrite from inhibiting bacterial growth. However, the complete nitrification process is not necessary in nitrogen removal from wastewater, and the process of oxidizing ammonia to nitrite ($NH_4^+ \rightarrow NO_2^-$) can achieve equally promising results. It is possible to eliminate the conversion of $NO_2^-$ to $NO_3^-$ during nitrification and $NO_3^-$ to $NO_2^-$ during denitrification in biological nitrogen removal. The process of controlling ammonia oxidation at the nitrite stage is called as the Short-cut Nitrification. In 1997 Delft University of Technology developed the Short-cut Nitrification and Denitrification which resolved the difficulties of treating sludge digester effluents which contain high ammonia concentration to some extent.

The key in the SHARON® technique is to optimize operational conditions in order to facilitate the growth of autotrophic ammonia-oxidizing bacteria (*Nitrosomonas* sp), especially *Nitrosomonas europh*, and to allow them to become dominant in the reactor. The conditions proposed by SHARON® enable the growth rate of ammonia-oxidizing bacteria to compensate for the sludge loss in the CSTR (Continuous Stirred Tank Reactor), whereas the growths of nitrite-oxidizing bacteria including Nitrobacteria are constrained and then washed out. Under these conditions, ammonia oxidation is controlled and restrained to the nitrite stage and nitrite acts as the electron acceptor in denitrification. Some main features of SHARON® are that: ① It is a shorter process with short-cut nitrification and denitrification being combined in one single reactor; ② There is no retention of biomass in the reactor, therefore only a simple reactor is required; ③ It demands high operation temperature (30~40° C.) to achieves effective treatment results; ④ Alkalinity can be adjusted by denitrification and pH is maintained between 7 and 8 without external alkaline addition.

Compared with conventional nitrogen removal technologies, SHARON® has the following advantages: lower investment and operation costs; easier start-up and operation; simpler maintenance; no production of chemical by-products. However, SHARON® has drawbacks, because it is still based on the traditional autotrophic nitrification theory. From the operational perspective, organic carbon removal, nitrogen removal and sludge disposal remain highly disintegrated. The high processing temperature (35° C.) places stringent requirements on reactors and is unable to treat large volume of wastewater with low ammonia concentration. It is difficult to be realized in traditional sequencing batch reactors (SBR). It still requires excess sludge discharge and relatively long hydraulic retention time (HRT) during denitrification compared with nitrification rate.

Wastewater treatment technology mainly utilizes the variety of bacteria metabolism to decompose and remove pollutants. Current carbon and nitrogen removal methods, including new biological nitrogen removal techniques with SHARON® as representative, are all based on the theory developed by Monod. The Monod theory (or cell growth theory) concerns the relationship between cell growth and organic carbon and nitrogen removal. Monod states that cell growth is associated simultaneously with the assimilation of organic carbon and nitrogen and the decomposition of excess substrate to fuel physiological behaviors. This theory has become the mainstream in microbiology and has guided a range of industrial applications, including organic carbon and nitrogen removal. In particular, it has exerted considerable influence in areas of reactor design, process design and operational management etc.

According to Monod theory, in regard with the kinetics of substrate conversion, bacterial growth and substrate utilization rate exhibit the following relationship:

$$\frac{ds}{dt} = -\frac{1}{Y}\frac{dx}{dt}$$

Where: ds/dt is the substrate utilization rate; Y is the biomass yield coefficient (biomass produced per mass of substrate utilized); X is the biomass concentration. It can be concluded from the equation that bacterial growth is directly related to substrate utilization, and that by improving bacterial growth rate, substrate utilization can be enhanced.

During inorganic $NH_4^+$ conversion in the traditional "heterotrophic-autotrophic-heterotrophic bacterial utilization" model, and according to Monod kinetics, bacterial growth rate or substrate utilization rate is extremely low. In theory, bacterial growth rate is 0.29 g/g (VSS/$NH_4^+$—N) and 0.084 g/g (VSS/$NO_2^-$—N)(McCarty pL. 1964) while experimental results are only 0.04~0.13 g/g (VSS/$NH_4^+$—N) and 0.02~0.07 g/g (VSS/$NO_2^-$—N). The biomass yield coefficient and substrate utilization coefficient of nitrifying autotrophs are 1-2 orders of magnitude slower than heterotrophs which has become the main limiting factors of nitrogen removal efficiency.

When the Monod theory is implemented in the batch reactor, substrate consumption and the accumulation of toxic substances often result in the deterioration of nutrient environment and other environmental conditions, such as extreme acidic or basic conditions, which in turn hinder cell growth or even lead to cell death. To eliminate these influences, industrial applications often adopt the "chemostat" in which fresh medium is continuously added to supplement nutrients and equal amount of culture liquid (biomass and toxic substances) is continuously discharged to reduce the accumulated biomass and toxic substances, and to sustain stable biomass growth and substrate removal.

The principles mentioned above have served as guidance in main technologies of organic carbon and nitrogen removal from wastewater. These principles have determined the configuration of almost all reactors (mostly continuous stirred tank reactor and continuous flow operation), and most importantly, they have led to the inevitable process of sludge accumulation and discharge during organic carbon and nitrogen removal.

Thus the need for the treatment and disposal of sludge is one of the most crucial problems to be solved of conventional biological wastewater treatment technologies.

Due to the autotrophic nature acknowledged in the prior art, the presence of organic substances is deleterious to the growth and physiological behavior of nitrifying bacteria, therefore any attempt to optimize the biological processes involved in organic carbon and nitrogen removal cannot overcome the inherent limitations.

The present inventor realized that the oxidation of $NH_4^+$ into $NO_2^-$ was largely related to the physiological behavior of heterotrophs, and thus adopted a method abandoned by the autotrophic theory and successfully isolated different heterotrophs with various ammonia oxidation activities. Certain strains exhibited high $NO_2^-$ accumulation properties under pure-culture conditions (Chinese Patent No. 03118598.3, "Methods for Separating and Identifying Heterotrophic Nitrifying Bacteria"). He further proposed a method to cultivate highly active nitrifying heterotrophs and applied them to nitrogen removal from water (Chinese Patent No. 03118597.5, "Cultivation and Application of Nitrifying Heterotrophs"), and proposed two different methods to remove ammonia (Chinese Patent No. 03118599.1, "Combination of nitrogen-removing bacteria and their Application", and Chinese Patent No. 200410005158.4, "Biological Ammonia Removal Methods from Wastewater and Relative Microorganisms").

However, the research mentioned above was mainly carried out with pure culture as inoculum, especially in single batch test based on the Monod theory. Therefore ammonia oxidation and nitrogen removal was not significantly more effective compared with classical autotrophic ammonia oxidation and denitrification. Another problem was that the growth of highly active heterotrophs was restrained at temperatures under 15° C. and thus ammonia oxidation activity was hard to exhibit. The technologies were unable to resolve the problems of nitrogen removal at low temperatures.

SUMMARY OF THE INVENTION

This invention proposes a method using heterotrophs to realize organic carbon and nitrogen removal. It is hoped that, by abandoning the autotrophic metabolism principle regarding the nitrifying bacteria, this method would overcome many of the problems characterizing classical processes, such as low efficiency in ammonia removal, disposal of excess sludge, and high energy consumption.

This invention is able to simultaneously remove organic carbon and nitrogen while no biomass accumulation occurs according to the physiological characteristics of "heterotrophic ammonia oxidizing bacteria" (HAOB) and carbon and nitrogen metabolism principles, which differs from the conventional methods which deem organic matter as inhibitor to the nitrogen-removing microorganisms.

This invention has consequently no sludge generated throughout the wastewater treatment process which eliminates the problems associated with sludge disposal in regard to traditional methods.

This invention can achieve organic carbon and nitrogen removal in one single reactor, and the conventional secondary treatment system can be still utilized without requiring any new apparatuses. This invention has overcome the limitations of temperature: effective short-course nitrification and denitrification processes can be achieved at a temperature range of 6-40° C. Thus, there is no need to comply to the stringent requirements of the SHARON® method which demands for a relatively short-course nitrification process, operated at temperatures between 30° C. and 40° C.

This invention proposes a method which can control short-cut nitrification and denitrification in both aerobic and anoxic conditions by controlling carbon source addition.

This invention provides a method for removing contaminant of carbon and nitrogen from wastewater by using the HAOB, comprising the following steps:

(A) Cultivation of HAOB activated sludge: seeding natural soils containing HAOB into substrates containing organic carbon and nitrogen and/or inorganic ammonia nitrogen, and aerating in a reactor while keeping pH within the range from 6.5 to 8.5, wherein if the substrate contains ammonia nitrogen, organic carbon source is supplied in batches; stopping aeration when ammonia nitrogen concentration falls below 3 mg/L and $NO_2^-$—N accumulation reaches maximum amount, maintaining an anoxic environment, and adding organic carbon source to allow denitrification to take place until the total of $NO_2^-$—N and $NO_3^-$—N concentrations are less than 1 mg/L; and (B) Removal of carbon and nitrogen from wastewater: seeding the activated sludge produced from step (A) into a biological treatment reactor containing wastewater comprising organic carbon and nitrogen and/or inorganic ammonia nitrogen, and aerating to allow the ammonia oxidation to take place, wherein if the wastewater does not contain organic carbon, additional organic carbon source is added into the reactor; and stopping aeration when nitrite has accumulated, maintaining an anoxic condition, and adding organic carbon source to allow denitrification to take place until no nitrite is present.

The HAOB mentioned above covers a range of microorganisms that are capable of carrying out the processes of ammonification, ammonia oxidation, and denitrification (reduction of nitrite and nitrate). Some main features of these bacteria include: ability to grow on PM plate and score positive when Griess-Ilosvay reagent is directly applied; ability to directly oxidize ammonia to $N_2$, $NO_2^-$, $NO_3^-$ under aerobic conditions; ability to remove nitrogen through denitrification with $NO_2^-$ and $NO_3^-$ as electron receptors and BOD as electron donor under aerobic and anoxic conditions.

The key concept of this invention is that the bacteria involved in ammonia oxidation are heterotrophic rather than autotrophic. Based on this breakthrough of knowledge, the bacteria are cultivated and utilized using heterotrophic method. Based on this new understanding of the nature and metabolism of ammonia oxidizing bacteria, the method abandons the classical autotrophic theory of nitrifying bacteria and proposes the concept of HAOB.

The classical understanding of the autotrophs involved in ammonia and nitrite oxidation during nitrification originated from the observation made by Winogradsky in 1890 of a specific type of autotrophic bacteria. The bacteria possess the following features: ①Obtaining energy solely from the oxidation of $NH_4^+$ and $NO_2^-$; ②Using $CO_2$ as the only carbon source in assimilation; ③Organic substances is deleterious to their growth therefore they are unable to grow on the classical nutrient agar plates.

Despite the autotrophic theory is often unable to explain many contradicting phenomenon, it is still the mainstream theory due to the fact that before this patent, highly active heterotrophic bacteria that oxidize ammonia to nitrite had not been found.

On the other hand, researchers constrained by the autotrophic theory often neglect the diversity of nitrogen oxidation products, and presume that $NO_2^-$ and $NO_3^-$ are the only metabolites. In fact, during the metabolism of these functional microbes, not only ammonification (decomposition of organic nitrogen into $NH_3$) but also $NO_2^-$ and $NO_3^-$ accumulation or $N_2$ release are found under different conditions. These heterotrophs exist in a wide range, and are classified in *Bergey's Manual of Systematic Bacteriology* with their properties described.

carbon as electron donor under aerobic or anoxic conditions. However, these heterotrophs are different in their activities. A limited number of bacteria exhibit very high ammonia-to-nitrite oxidation activity, e.g. *Bacillus pseudofirmus* NH-2 and *Arthrobacter globiformis* WR-2, with the former one also exhibiting high nitrite-to-nitrate oxidation activity. This discovery shows that nitrification isn't a process carried out by two different groups of autotrophs consecutively with one group oxidizing ammonia to nitrite and another group from nitrite to nitrate.

Therefore, the oxidation of trivalent negative nitrogen to various forms of nitrogen oxides by heterotrophs is distinctly different from the concept of autotrophic ammonia oxidation. These bacteria capable of ammonification, ammonia oxidation and denitrification of nitrite or nitrate are termed collec-

TABLE 1

Nitrogen metabolism of different bacteria

| Name of bacteria | Preservation Accession number | Growth on PM plate[1]/ positive with Griess-Ilosvay reagent | Nitrogen loss in aerobic environments with abundant carbon source[2] | $NO_2^-$—N accumulation in pure culture[3] mg/L | $NO_3^-$—N accumulation in pure culture[4] mg/L | Denitrification in aerobic or anoxic pure culture[5] |
|---|---|---|---|---|---|---|
| *Bacillus megaterium* | CGMCC NO. 0554 | ✓/++ | ✓ | <5 | ND | ✓ |
| *Bacillus firmus* | CGMCC NO. 0555 | ✓/++ | ✓ | <5 | ND | ✓ |
| *Bacillus brevis* | CGMCC NO. 0556 | ✓/++ | ✓ | <5 | ND | ✓ |
| *Bacillus circulans* | CGMCC NO. 0557 | ✓/+ | ✓ | <5 | ND | ✓ |
| *Bacillus coagulans* | CGMCC NO. 0558 | ✓/++ | ✓ | <5 | ND | ✓ |
| *Bacillus lentus* | CGMCC NO. 0559 | ✓/+++ | ✓ | <5 | ND | ✓ |
| *Bacillus cereus* | CGMCC NO. 0560 | ✓/++ | ✓ | <5 | ND | ✓ |
| *Bacillus pumilus* | CGMCC NO. 0561 | ✓/++ | ✓ | <5 | ND | ✓ |
| *Bacillus licheniformis* | CGMCC NO. 0562 | ✓/++ | ✓ | <5 | ND | ✓ |
| *Bacillus globisporus* | CGMCC NO. 0563 | ✓/+ | ✓ | <5 | ND | ✓ |
| *Bacillus sphaericus* | CGMCC NO. 0564 | ✓/++ | ✓ | <5 | ND | ✓ |
| *Bacillus badius* | CGMCC NO. 0565 | ✓/+++ | ✓ | <5 | ND | ✓ |
| *Bacillus subtilis* | CGMCC NO. 0566 | ✓/++ | ✓ | <5 | ND | ✓ |
| *Bacillus mycoides* | CGMCC NO. 0586 | ✓/++ | ✓ | <5 | ND | ✓ |
| *Bacillus pseudofirmus* | CCTCC M203101 | ✓/++++ | ✓ | 80~90 | >15 | ✓ |
| *Paenibacillus campinasensis* | CCTCC M203102 | ✓/++ | ✓ | <5 | ND | ✓ |
| *Arthrobacter ramosus* | CCTCC M203103 | ✓/+ | ✓ | <5 | ND | ✓ |
| *Arthrobacter sulfurous* | CCTCC M203104 | ✓/++ | ✓ | <5 | ND | ✓ |
| *Arthrobacter globiformis* | CCTCC M202043 | ✓/++++ | ✓ | 90~100 | ND | ✓ |

Note:
[1] means heterotrophic growth and ability to carry out ammonification and ammonia oxidation to nitrite;
+ means activity of ammonia oxidation to nitrite, i.e. accumulated $NO_2^-$—N concentration (mg/L); + is equivalent to 0.5 mg/L; ++ is equivalent to 1.0~2.5 mg/L; +++ is equivalent to 2.5~5.0 mg/L; ++++ is equivalent to 5.0~10.0 mg/L.
[2] means pathway of nitrogen removal ($NH_3 + O_2 \rightarrow N_2$)
[3] means short nitrification ($NH_3 + O_2 \rightarrow NO_2^-$) in a single stage batch test in a shaking reactor with the addition of carbon source (Pyruvate for example)
[4] means nitrite oxidation to nitrate ($NO_2^- + O_2 \rightarrow NO_3^-$)
[5] means aerobic or anoxic denitrification with $NO_2^-$ or $NO_3^-$ as electron acceptor and organic carbon as electron donor ($NO_2^- + COD \rightarrow N_2 \uparrow + CO_2 \uparrow$).

As shown in Table 1, the bacteria share the following common features: able to grow on PM plate and score positive when Griess-Ilosvay reagent is directly applied; able to directly oxidize ammonia to $N_2$, $NO_2^-$ and $NO_3^-$ under aerobic conditions; able to remove nitrogen through denitrification with $NO_2^-$ and $NO_3^-$ as electron receptors and organic tively as "Heterotrophic Ammonia Oxidation Bacteria (HAOB)". It should be noted that these bacteria are not named according to taxonomy. They are a group of microorganisms capable of carrying out coupled energy generation through continuous combined oxidation-reduction of carbon and nitrogen.

Based on the concept of HAOB, a carbon and nitrogen combined heterotrophic oxidation model is configured to describe the energy coupling and electron transfer process. $NAD^+$ acts as the electron carrier for both combined oxidation and electron transfer. Thermodynamic calculation is applied to each step.

The electron transfer process in Krebs cycle, and the combined oxidation of carbon and nitrogen are illustrated in FIG. 4.

Thermodynamic data for ammonia conversion are presented in Table 2.

TABLE 2

Thermodynamics in ammonia conversion process

|   | $\Delta G^{0'}$(KJ/mol) |
|---|---|
| 1. $NH_3 + \frac{1}{2}NAD^+ = \frac{1}{2}NH_2\text{-}NH_2 + \frac{1}{2}NADH + \frac{1}{2}H^+$ | +114 |
| $\frac{1}{2}NADH + \frac{1}{4}O_2 + \frac{1}{2}H^+ = \frac{1}{2}NAD^+ + \frac{1}{2}H_2O$ | −110 |
| Overall: $NH_3 + \frac{1}{4}O_2 = \frac{1}{2}NH_2\text{-}NH_2 + \frac{1}{2}H_2O$ | +4 |
| 2. $\frac{1}{2}NH_2\text{-}NH_2 + \frac{1}{2}NAD^+ + H_2O = NH_2OH + \frac{1}{2}NADH + \frac{1}{2}H^+$ | +128 |
| $\frac{1}{2}NADH + \frac{1}{4}O_2 + \frac{1}{2}H^+ = \frac{1}{2}NAD^+ + \frac{1}{2}H_2O$ | −110 |
| Overall: $\frac{1}{2}NH_2 - NH_2 + \frac{1}{4}O_2 + \frac{1}{2}H_2O = NH_2OH$ | +18 |
| 3. $NH_2OH + \frac{1}{2}NAD^+ = \frac{1}{2}N_2 + \frac{1}{2}NADH + H_2O + \frac{1}{2}H^+$ | −190 |
| $\frac{1}{2}NADH + \frac{1}{4}O2 + \frac{1}{2}H^+ = \frac{1}{2}NAD^+ + \frac{1}{2}H_2O$ | −110 |
| Overall: $NH_2OH + \frac{1}{4}O_2 = \frac{1}{2}N_2 + \frac{3}{2}H_2O$ | −300 |
| 4. $NH_2OH + NAD^+ = [NOH] + NADH + H^+$ | +68 |
| $NADH + \frac{1}{2}O_2 + H^+ = NAD^+ + H_2O$ | −220 |
| $[NOH] = \frac{1}{2}N_2O + \frac{1}{2}H_2O$ | −85 |
| Overall: $NH_2OH + \frac{1}{2}O_2 = \frac{1}{2}N_2O + \frac{3}{2}H_2O$ | −237 |
| 5. $\frac{1}{2}N_2O + \frac{1}{2}NAD^+ + \frac{1}{2}H_2O = NO + \frac{1}{2}NADH + \frac{1}{2}H^+$ | +144 |
| $\frac{1}{2}NADH + \frac{1}{4}O_2 + \frac{1}{2}H^+ = \frac{1}{2}NAD^+ + \frac{1}{2}H_2O$ | −110 |
| Overall: $\frac{1}{2}N_2O + \frac{1}{4}O_2 = NO$ | +34 |
| 6. $NO + \frac{1}{2}NAD^+ + H_2O = NO_2^- + \frac{1}{2}NADH + \frac{2}{3}H^+$ | +46 |
| $\frac{1}{2}NADH + \frac{1}{4}O_2 + \frac{1}{2}H^+ = \frac{1}{2}NAD^+ + \frac{1}{2}H_2O$ | −110 |
| Overall: $NO + \frac{1}{2}O_2 + \frac{1}{2}H_2O = NO_2^- + H^+$ | −64 |
| 7. $NO_2^- + \frac{1}{2}NAD^+ + \frac{1}{2}H^+ = NO_2 + \frac{1}{2}NADH$ | +134 |
| $\frac{1}{2}NADH + \frac{1}{4}O_2 + \frac{1}{2}H^+ = \frac{1}{2}NAD^+ + \frac{1}{2}H_2O$ | −110 |
| Overall: $NO_2^- + \frac{1}{4}O_2 + H^+ = NO_2 + \frac{1}{2}H_2O$ | +24 |
| 8. $NO_2 + \frac{1}{2}NAD^+ + H_2O = NO_3^- + \frac{1}{2}NADH + 3/2H^+$ | +26 |
| $\frac{1}{2}NADH + \frac{1}{4}O_2 + \frac{1}{2}H^+ = \frac{1}{2}NAD^+ + \frac{1}{2}H_2O$ | −110 |
| Overall: $NO_2 + \frac{1}{4}O_2 + \frac{1}{2}H_2O = NO_3^- + H^+$ | −84 |

According to the electron transfer model and relevant calculations of standard free energy changes, it may be deduced that during ammonia oxidation process in which ammonia is dehydrogenated and electrons are transferred to reduce $NAD^+$ to NADH with energy being stored, only the step $NH_4^+ + NAD^+ \rightarrow N_2 + NADH$ is likely to be carried out spontaneously ($\Delta G^{0'} < 0$), all other steps in which ammonia is oxidized and NADH is formed are non-spontaneous ($\Delta G^{0'} > 0$). In other words, autotrophic are incapable of producing the NADH needed for assimilation through nitrification. Furthermore, the Calvin Cycle which produces energy through oxidizing NADH, and carries out the assimilation of $CO_2$ to form cell component is dependent on large consumption of energy (solar energy, ATP etc.).

When we take into account the second law of thermodynamics and that energy can only be transferred from high energy units to low energy units without assistance, we realize that nitrification autotrophic which utilize $CO_2$ as single carbon source and generate energy solely from ammonia oxidation are in fact non-existent.

It is generally acknowledged that free energy changes under constant temperature and pressure are indicators of maximum net useful work generated from reactions. In biological systems, net useful work is utilized in biosynthesis for cell growth and in cell movement as mechanical force, or utilized to maintain certain physiological features, such as cell osmotic pressure produced by the difference in Na+ and K+ concentrations between the inside and outside of cells, or utilized to produce osmotic work by proton motive force due to proton gradient The work for biosynthesis, taken for instance, is the main work to reduce the free energy of the reactions during cell growth. The biological system utilizes this energy coupling mechanism to produce maximum useful work to sustain growth and other physiological activities.

In fact, the coupling between energy-producing metabolism and energy-consuming reactions is not necessarily hard to occur. It is recognized that only when the two reactions have a common reactant or product can they be coupled.

According to the principles mentioned above and the combined carbon and nitrogen oxidation theory model, two traditionally seemingly unrelated processes—organic carbon oxidation and ammonia oxidation—are connected by the present inventor. In the combined processes, energy is coupled by the participation of electron carrier $NAD^+$, which acts as the product or the reactant in the carbon oxidation (through Kreb cycle) and ammonia oxidation. This indicates that the microorganisms involved in these processes are heterotrophic.

From analysis of the above theory, we can reveal the principle of the carbon-source regulated heterotrophic ammonia oxidation process and product composition.

1. Calculation of Maximum Net Work in the Aerobic Ammonia Oxidation

According to the electron transport model and related thermodynamic calculations, if the loss of gaseous intermediates such as $N_2O$, NO and $NO_2$ are neglected, and $N_2$, $NO_2^-$ and $NO_3^-$ are regarded as the only final products of ammonia oxidation, in which $N_2$ is considered as the inevitable product, we can simplify the process according to the law of conservation of matter and the law of conservation of energy:

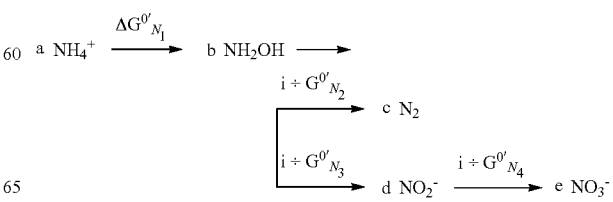

Where a, b, c, d, e are the amount of substance for original reactant, intermediate and final product during ammonia oxidation, respectively. According to the law of conservation of matter, we can deduce the following relationship:

$$a=b=2c+d+e=1 \text{ mol},$$

where $\Delta G_{N_1}^{0'}$, $\Delta G_{N_2}^{0'}$, $\Delta G_{N_3}^{0'}$ and $\Delta G_{N_4}^{0'}$ refer to the standard free energy change during each corresponding step in the process mentioned above wherein $$\Delta G_{N_1}^{0'}=+22 \text{ KJ/mol } \Delta G_{N_2}^{0'}=-190 \text{ KJ/mol}$$

$$\Delta G_{N_3}^{0'}=-267 \text{ KJ/mol } \Delta G_{N_4}^{0'}=-60 \text{ KJ/mol}$$

Thus, the total free energy change of oxidizing ammonia to intermediate $NH_2OH$ and final products $N_2$, $NO_2^-$ and $NO_3^-$ can be represented by $\Delta G_{N_{Total}}^{0'}$ $$\Delta G_{N_{Total}}^{0'}=a\Delta G_{N_1}^{0'}+2c\Delta G_{n_2}^{0'}d\Delta G_{N_3}^{0'}+e\Delta G_{N_4}^{0'}$$

$NH_2OH$ is proved to be an inevitable intermediate of ammonia oxidation by experiments in biological oxidation and chemical oxidation as well. Due to the fact that oxidation of ammonia to $NH_2OH$ is an endothermic reaction, oxidation of certain other substance is required to provide energy and allow the reaction to proceed to the further oxidation of $NH_2OH$.

When some organic carbon participates in the ammonia oxidation process, the net work $\Delta G_{Total}^{0'}$ by heterotrophs through ammonia oxidation process, i.e. a process with the combination of carbon and nitrogen oxidation, can be expressed as $$\Delta G_{Total}^{0'}=\Delta G_{N_{Total}}^{0'}+\Delta G_{C_{Total}}^{0'}$$

where $\Delta G_{C_{Total}}^{0'}$ is the energy required to initiate ammonia oxidation in the presence of organic carbon. $\Delta G_{N_1}^{0'}$ is the energy required for ammonia oxidation.

$$\Delta G_{C_{Total}}^{0'}=n \cdot \Delta G_C^{0'}$$

Therefore, the equation can be further expressed as $$\Delta G_{Total}^{0'}=\Delta G_{N_{Total}}^{0'}+\Delta G_C^{0'}=a\Delta G_{N_1}^{0'}+2c\Delta G_{N_2}^{0'}+d\Delta G_{N_3}^{0'}+e\Delta G_{N_4}^{0'}+n\Delta G_C^{0'}$$

where n refers to the amount of substance of organic carbon or energy-producing matters involved in ammonia oxidation.

When $-a \cdot \Delta G_{N_1}^{0'}=n \cdot \Delta G_C^{0'}=-22$ KJ, that is to say the energy generated form oxidizing organic carbon is sufficient to oxidize ammonia into $NH_2OH$, we get:

$$\Delta G_{N_1}^{0'}+n \cdot \Delta G_C^{0'}=0$$

Therefore, the maximum net work of combined carbon and nitrogen oxidation $\Delta G_{max}^{0'}$ can be described by $$\Delta G_{max}^{0'}=\Delta G_{Total}^{0'}=2c\Delta G_{n_2}^{0'}+d\Delta G_{N_3}^{0'}+e\Delta G_{N_4}^{0'}$$

Obviously $\Delta G_{max}^{0'}$ is related to the dominating HAOB, described in this invention, in the activated sludge.

2. Regulation of HAOB-Related Ammonia Oxidation and Corresponding Product Composition by Carbon Control A) Under the circumstance that the dominating bacteria in the activated sludge are HAOB which are able to oxidize ammonia into $NO_3^-$ or $N_2$, such as species of the *Bacillus pseudofirmus*, 1) If the dominating HAOB in the activated sludge are those that oxidize ammonia completely to $NO_3^-$ or $N_2$ (e.g. *Bacillus pseudofirmus*), $$2c+d+e=1 \text{ mol } d=0 \text{ mol}$$

$$\Delta G_{max}^{0'}=2c\Delta G_{N_2}^{0'}+e(\Delta G_{n_3}^{0'}+e\Delta G_{N_4}^{0'})$$

Let the energy required for producing $NO_3^-$ and $N_2$ in the two parallel reactions in ammonia oxidation equal, $$2c\Delta G_{N_2}^{0'}=e(\Delta G_{N_3}^{0'}+e\Delta G_{N_4}^{0'})$$

Then maximum net work $\Delta G_{max}^{0'}$ can be calculated as −239 KJ during combined carbon and nitrogen oxidation. Ammonia oxidation products, $NO_3^-$—N and $N_2$, are 0.36 mol and 0.32 mol, respectively.

2) If the dominating HAOB oxidize ammonia completely to $N_2$ and $NO_2^-$, and no accumulation of $NO_3^-$ occurs, $$2c+d+e=1 \text{ mol } e=0 \text{ mol},$$

$$\Delta G_{max}^{0'}=a\Delta G_{N_1}^{0'}+2c\Delta G_{N_2}^{0'}+d\Delta G_{N_3}^{0'}e\Delta G_{N_4}^{0'}+n\Delta G_C^{0'}$$

Therefore $n\Delta G_C^{0'}=-43.4$ KJ.

The results indicate that when energy produced from carbon oxidation exceeds +43.4 KJ, ammonia oxidation can be controlled at the short-cut nitrification stage at which no $NO_3^-$ accumulates.

3) If the dominating HAOB oxidize ammonia completely to mere $N_2$, and no $NO_2^-$ or $NO_3^-$ is produced, $$2c+d+e=1 \text{ mol } d=e=0 \text{ mol}$$

$$\Delta G_{max}^{0'}=a\Delta G_{N_1}^{0'}+2c\Delta G_{N_2}^{0'}+n\Delta G_C^{0'}$$

Therefore $n\Delta G_C^{0'}=-71$ KJ.

In other words, when energy produced from carbon oxidation exceeds +71 KJ, ammonia is exclusively oxidized into $N_2$ B) Under the circumstance that the dominating HAOB are highly active nitrite-forming bacteria that oxidize ammonia to nitrite (hereinafter referred to as nitrite-forming heterotrophs), such as the *Bacillus circulans*, then according to the principles mentioned above, we can calculate the maximum net work and the ratio between the two oxidation products—$NO_2^-$ and $N_2$-during the combined carbon and nitrogen oxidation. Also, for 1 mole of ammonia oxidized, 1) If $n\Delta G_C^{0'}=-22$ KJ, $N_2:NO_2^-$—N=0.58:0.42;
2) If $-22$ KJ$<n\Delta G_C^{0'}<0$, $N_2<0.58$ mol, and $NO_2^-$—N$>0.42$ mol;
3) If $n\Delta G_C^{0'}<-22$ KJ, $N_2>0.58$ mol, and $NO_2^-$—N$<0.42$ mol;
4) If $n\Delta G_C^{0'}=0$ KJ, all the processes mentioned above during ammonia oxidation are unable to take place.

The organic carbon sources required in ammonia oxidation can be supplied by a range of sewage water or external carbon sources. By dosing organic substances during the aerobic stage, we are able to control the ratio of different ammonia oxidation products. This is of particular significance to the denitrification of sewage rich in inorganic ammonia but poor in BOD, i.e. low C/N ratio. Preferably, the present invention aims to limit the ammonia oxidation process to the stage of "short-cut nitrification" at which $NO_2^-$—N concentration exceeds that of $N_2$.

It is necessary to emphasize that the principles and control techniques described in this invention are distinctly different from what has been called "simultaneous nitrification-denitrification" (SND) in wastewater treatment technology in recent ten years. In this invention, $N_2$ is the inevitable or direct product of ammonia oxidation by HOAB in aerobic conditions in the presence of organic substances, not the indirect product of denitrification with $NO_2^-$ or $NO_3^-$ as electron receptor.

3. Calculations of Carbon Source Requirement for Ammonia Oxidation by HAOB

Since $$n \cdot \Delta G_C^{0'} = \frac{W_C}{M_C} \cdot \Delta G_C^{0'},$$

where $W_c$, $M_c$ refer to the mass and molar mass of a certain organic carbon source involved in ammonia oxidation, respectively, $$W_C = \frac{\Delta G^{0'}_{N_1}}{\Delta G^{0'}_C} \cdot M_C$$

According to the equations above, we can obtain the amount of organic carbon source needed by HAOB to produce different ammonia oxidation products and achieve certain products ratio.

For example, if we add pyruvic acid ($CH_3COCOOH$) or anhydrous sodium acetate (hereinafter referred to as sodium acetate or NaAc) to wastewater rich in inorganic ammonia and devoid of BOD, we can obtain the following results:

TABLE 3

Relationship between the carbon source dosages and products composition

| Carbon source and dosage(g) | $CH_3COCOOH$ | 1.67 (Threshold value) | <1.67 | 1.67~7.52 | >7.52 |
|---|---|---|---|---|---|
| | NaAc | 2.1 (Threshold value) | <2.1 | 2.1~9.42 | >9.42 |
| Product percentage (%) | $N_2$ | 58 | <58 | >58 | ≈100 |
| | $NO_2^-$—N | 42 | >42 | <42 | ≈0 |

$\Delta G^{0'}$ is calculated according to the half reactions in which $CH_3COCOOH$ and NaAc are completely oxidized into $CO_2$.

$CH_3COCOOH+2.5O_2+H_2O=3HCO_3^-+3H^+ \Delta G^{0'}=-1157$ KJ/mol $CH_3COO^-+O_2=2HCO_3^-+H^+ \Delta G^{0'}=-863$ KJ/mol With this energy value produced in carbon oxidation, we can deduce the corresponding COD or BOD value, or calculate the amount of substance of a certain organic carbon source.

The HAOB mentioned above and their metabolism mechanism will lead to technological breakthrough for carbon and nitrogen removal from wastewater if applied to industry.

The invention describes the following procedures:

A) Cultivation of HAOB Activated Sludge

Natural soils are seeded into substrates containing organic carbon and organic nitrogen and/or ammonia. Aeration and non-aeration are applied. Different from the autotrophic nitrification theory, the method of this invention uses heterotrophic bacterial culture and organic carbon sources such as organic acid or their corresponding salts including, but not limited to, anhydrous acetic acid, sodium acetate, pyruvic acid or their mixtures. The external organic carbon source is requisite for the metabolism of HAOB, especially highly active nitrite-forming heterotrophs that oxidize ammonia to nitrite.

During aeration stage, bacteria grow and carry out ammonia oxidation and produce $NO_2^-$; during anoxic stage when aeration is ceased, denitrification starts which results in the disappearance of $NO_2^-$ from the culture, and sludge up-flow caused by the production of large quantities of bubbles.

pH increases as organic nitrogen substrate is ammonified and proteins are decomposed during HAOB cultivation. But as ammonia oxidation subsequently takes place, which generates $NO_2^-$, pH gradually decreases. Therefore, to stabilize pH in the reactor to promote bacteria growth, organic acid and other organic carbon source may be added at different intervals according to pH variation. During the growth of the activated sludge, ammonia concentration decreases gradually and $NO_2^-$—N accumulates as aeration continues. Under aerobic conditions, organic carbon source will initiate aerobic denitrification, causing the transient disappearance of $NO_2^-$—N which later re-accumulates to a higher concentration. This process is repeated with each supplement of organic carbon until ammonia oxidation almost disappears and $NO_2^-$—N accumulation reaches maximum amount. This indicates that HAOB has reached maximum quantity with their activity fully expressed, and becomes dominant in the sludge.

The procedures mentioned above are able to fully exploit the activity of HAOB and enable highly active nitrite-forming heterotrophs such as *Bacillus* pseudofirmus NH-2 and *Arthrobacter* globiformis to be dominant in the activated sludge. This can be proved by using the methods described in the Chinese Patent 03118598.3. The method provides ways to identify, separate and count HAOB. It can also be reflected by the accumulation of $NO_2^-$—N per unit volume per unit time (mg/L/min).

Since the growth and ammonia oxidation activity of HAOB (with $NO_2^-$ production as indicator) are specifically regulated by the energy metabolism of the combined carbon and nitrogen oxidation, HAOB are capable of removing ammonia or accumulating $NO_2^-$—N in both cell growth and non-cell-growth periods, depending on the type and amount of carbon source applied. Certain details of the cultivation process with $NO_2^-$—N accumulation as an indicator should be adjusted according to the specific dominating HAOB species in the sludge to eliminate the impact of dramatic pH fluctuation caused by the difference in carbon and nitrogen utilization during cultivation.

Thus, the aeration (or ammonia oxidation) and non-aeration (denitrification) can be controlled according to the principles shown below.

The present invention is widely applicable under different conditions and different sludge concentrations and sludge sources, and it is possible to exert control by regulating pH or accumulated $NO_2^-$—N concentration during aeration. The general principle is that during the aerobic stage, pH should be controlled in the range of 6.5~8.5. The reason is that when pH≦16.5, ammonia-to-nitrite oxidation rate significantly decreases which is disadvantageous to total nitrogen removal. On the other hand, the presence of high $HNO_2$ concentration will inhibit the growth of other bacteria, in particular, filamentous bacteria, which will prevent sludge bulking and ensure that highly active dominant HAOB species exist in the system. pH may also rise due to the alkalinity produced from denitrification. When pH exceeds 9, bacteria are susceptible to death and thus pH should be held in the range of 6.5~8.5. pH can be controlled by means of adding organic carbon source, or acid or alkali. When ammonia nitrogen ≦3 mg/L and $NO_2^-$—N accumulation reaches maximum amount, aeration is ceased to maintain an anoxic environment, and then with the addition of carbon source, denitrification takes place. Ammonia refers to $NH_3$ and $NH_4^+$ in total. The use of pH and $HNO_2$ as indicators may facilitate the intelligent control of aeration and non-aeration.

During cultivation of HAOB activated sludge, temperature is held in the ambient temperature range, for example, 20~40° C. In case of continuous culture at temperatures below 15° C., sludge growth and ammonia concentration decrease are slow, and no accumulations of $NO_2^-$—N and $NO_3^-$—N are observed, indicating that cells experience slow growth at low temperatures according to the Monod theory. However, one of the significant features of the invention is that we can cultivate HAOB under ambient temperatures and use them at low temperatures. This feature stems from the principle of carbon and nitrogen removal under non-cell-growth, which is to be described below.

After cultivation, the HAOB activated sludge produced from step A) are seeded into a bioreactor (i.e., the biological treatment reactor as mentioned above) containing wastewater with organic carbon and organic nitrogen and/or ammonia. The mixture is aerated and, if no organic carbon is present, organic carbon source may be added into the water to allow ammonia oxidation to proceed. Once $NO_2^-$—N begins to accumulate, aeration is stopped to maintain an anoxic environment, and then organic carbon source is added to initiate denitrification. Denitrification is continued until no nitrite is present.

In step B), the removal of carbon and nitrogen is achieved through aerobic and anoxic processes or, through aeration and non-aeration control. Aerobic process carries out COD removal, and ammonia oxidation—a process similar to what called nitrification in current technologies except that the aerobic process is carried out by HAOB with $N_2$ and $NO_2^-$ as products. On the other hand, the anoxic process is similar to present denitrification technology, in which organic carbon is added when $NO_2^-$—N accumulate to some extent, and anoxic conditions are maintained until no $NO_2^-$—N is present. However, the difference between this invention and present technologies is that carbon and nitrogen removal is achieved by heterotrophs.

The present invention is applicable to a wide range of nitrogen-containing wastewaters, for example, municipal sewage with TKN (Total Kjeldahl Nitrogen) ranging between 20 and 80 mg/L, high concentration organic wastewaters (TKN: 400~500 mg/L) such as coking wastewater, or industrial wastewaters (TKN: 1000~2000 mg/L) such as wastewater from fertilizer and monosodium glutamate factories. In step B), $NO_2^-$—N accumulation can be held at the level of 0.5~125 mg/L during ammonia oxidation. Once the desired level reached, anoxic denitrification is allowed to occur. According to step B), different levels of nitrogen may require repeated ammonia oxidation and denitrification to remove carbon and nitrogen and to achieve the desired concentration, such as ammonia concentration less than 3 mg/L.

Non-cell-growth based biological technology for carbon and nitrogen removal is developed in this invention to overcome the defects of conventional biological treatment methods, and the limitations of denitrification caused by the low growth rate and substrate conversion efficiency of ammonia oxidizing bacteria.

As already mentioned above, current wastewater treatment is mainly based on the Monod theory which relates bacterial growth to substrate removal. According to the theory, large quantities of sludge need to be discharged, and low temperatures will lead to slow cell growth rate and ineffective assimilation of ammonia and, consequently low accumulation of ammonia oxidation product $NO_2^-$—N even for HOAB.

It is generally recognized that the principles underlying carbon and nitrogen removal from wastewater are the theories from thermodynamic and enzyme kinetics, in other words, the principles of enzyme-promoting biochemical reactions under cell growth. The principles upon which this invention is based do not contradict with the classical enzyme-promoting theories, synthesis and expression of enzymes have already been fully achieved when growth of ammonia oxidizing bacteria reaches maximum.

Consequently, carbon and nitrogen removal is irrelevant to bacterial growth and only related to enzyme activity and enzyme quantity. The ammonia oxidation activity of HAOB activated sludge cultivated from step A) has already been fully expressed and can therefore be utilized at different temperatures to achieve microorganism function. Furthermore, according to the enzyme-promoted non-cell-growth principle, HAOB activated sludge can be retained inside the reactor without constant discharge of sludge or bacteria cells which is required for conventional method according to the cell-growth principle.

Therefore, some concepts in this invention are different from classical concepts traditionally applied in conventional activated sludge system. For example, sludge age (sludge retention time, SRT) is traditionally defined as the ratio between total amount of sludge in the reactor and sludge discharged per unit time. In other words, it is the ratio between the amount of sludge contained in the activated sludge system ($M_x$) and sludge production ($F_{SP}$, the amount of sludge discharged per unit time), $SRT = M_x/F_{sp}$. However, throughout the process of the present method, no sludge is discharged, $F_{sp}=0$, $SRT \to \infty$, therefore, $SRT \gg HRT$, which further reflects that the enzyme theory involved in carbon and nitrogen removal in this invention is distinctly indifferent from classical growth theory. Therefore, the present invention solves the problems occurred in the conventional wastewater treatment process that a large quantity of sludge has to be discharged, and then treated.

According to the principles of carbon and nitrogen removal under non-cell-growth conditions, the HAOB activated sludge cultivated from step A) are able to function at temperatures lower than ambient temperature. In other words, the technique is characterized by ambient-temperature cultivation and low-temperature utilization and, as mentioned in Step B), it is able to achieve effective ammonia oxidation and denitrification when operated at the temperature of 6~40° C.

In addition, the invention has significantly improved ammonia oxidation efficiency through the increase of sludge concentration and improvement of oxygen mass transfer efficiency, which again reflects the non-cell-growth theory during carbon and nitrogen removal.

The sludge concentration and aeration conditions of step B) can be determined according to conventional technologies. The increase of activated sludge can greatly increase wastewater treatment efficiency, and significantly decrease hydraulic retention time (HRT), aeration time and non-aeration time. Correspondingly, the enhancement of aeration can upgrade treatment ability and reduce HRT, aeration time and non-aeration time.

Step B) can be generally applied in various kinds of existing biological reactors, for example, suspended activated sludge reactors, biofilm reactors, sequencing batch reactors (SBR), or continuous flow reactors, or their combinations.

The utilization of HAOB activated sludge to remove carbon and nitrogen can be achieved in the traditional two-stage biological treatment system, which eliminates the need for constructing new reactors. The biological features of HAOB enable carbon and nitrogen removal from wastewater to be achieved in a single SBR, or in a continuous stirred tank reactor (CSTR). The process can be easily realized by the control of aeration to create aerobic and anoxic conditions. This greatly reduces the number of reactors, simplifies operation process and avoids many difficulties involved in complicated reactor set-up which characterizes conventional methods.

The technological process of carbon and nitrogen removal in a single SBR is shown in FIG. 1. Activated sludge containing HAOB is seeded into wastewater containing COD and $NH_3$. Then, aeration and non-aeration initiate aerobic phase (phase I) and anoxic phase (phase II) subsequently in the same SBR at temperature between 6-40° C. (FIG. 1). Phase I involves COD removal and ammonia oxidation of nitrogen in aerobic conditions by heterotrophs, and consequently results in $N_2$ release or $NO_2^-$—N accumulation. Once $NO_2^-$—N reaches a certain level, aeration is stopped to create an anoxic condition, i.e. the phase II, wherein organic carbon source is added to perform denitrification until $NO_2^-$—N disappears. The loop from phase I to phase II can be repeated several times until carbon and nitrogen contaminants are generally removed and reaches a certain standard, for example, ammonia less than 3 mg/L.

A settling tank is unnecessary in the process as phase I and phase II don't require sludge separation. In addition, sludge floatation caused by $N_2$ release during denitrification in the anoxic phase can be readily utilized to achieve spontaneous sludge separation. Effluent (i.e., the treated wastewater) can be discharged from the lower part of the reactor by gravity which reduces unnecessary power consumption and avoids the need of a settling tank or sludge recycling process.

From the previous discussion about the regulation of HAOB-related ammonia oxidation and corresponding products composition by carbon control, it can be seen that it is therefore possible in step B) to control the ammonia oxidation products composition by controlling organic carbon source addition into the biological reactors under aerobic conditions. The organic carbon source in a biological reactor includes organic carbon from wastewater (COD or BOD) and external organic carbon source when needed. Therefore, ammonia oxidation products can be regulated at different levels by changing the amount and types of external organic carbon and oxygen supply. Appropriate carbon control and oxygen supply not only enable simultaneous carbon and nitrogen removal under aerobic conditions, but also are able to optimize the process at the most advantageous level.

Consequently, step B) preferably limits the reaction at the short-cut nitrification stage. Ammonifications into $N_2$ and $NO_2^-$ coexist in the presence of a certain organic substance. $NO_2^-$—N accumulation predominates over $N_2$ production and the reaction can be controlled at the short-cut nitrification stage wherein $NO_2^-$—N accumulates without $NO_3^-$—N produced. This process is facilitated by highly active HAOB, such as *Bacillus* pseudofirmus NH-2 and *Arthrobacter* globiformis WR-2 as mentioned in this invention.

Because of the existence of COD, part of the ammonia can be oxidized to $N_2$ such that oxygen supply and energy consumption can be reduced Alkalinity regenerated from denitrification neautralizes acid produced from ammonia oxidation, which significantly cuts down alkalinity requirement—this is similar to what has been described in SHARON®.

Different from what has been described in the autotrophic growth theory underpinning common ammonia removal methods, fully cultivated heterotrophs are active at various temperatures. They can carry out ammonia oxidation process steadily at the $NO_2^-$ stage, and thus overcome the complexities involved in pH control, DO control, temperature control and free ammonia control. In particular, it solves the problems associated with high operation temperature, such as high energy consumption in the winter and ineffective ammonia removal for high-concentrated wastewater, which is characteristic of the SHARON® technique. The invention can remove high carbon and nitrogen from various wastewaters effectively.

In all, compared with traditional technologies and the SHARON® Technique, the method according to the present invention possesses some obvious advantages as follows:
1) According to the physiological characters of HAOB and its carbon and nitrogen catabolism features, the method is able to remove carbon and nitrogen simultaneously under non-cell-growth condition.
2) No sludge discharge is required throughout the wastewater treatment process, which eliminates difficulties associated with sludge disposal in traditional activated sludge technologies.
3) The activated sludge according to the present invention is able to achieve carbon and nitrogen removal in a conventional activated sludge system without constructing new reactors, and thus the construction costs can be greatly reduced. The purpose of this invention can be fulfilled in a single biological reactor, and therefore the activated sludge can be applied in a variety of already existing biological treatment reactors.
4) The method has overcome the limitations of temperature: effective short-cut nitrification and denitrification can be achieved in the temperature range of 6-40° C., while in SHARON® process stringent conditions of 30-40° C. are required to achieve short-cut nitrification.
5) Short-cut nitrification and denitrification can be achieved in both aerobic and anoxic conditions through the control of carbon source.
6) Compared with SHARON® process, the invention has high short-cut denitrification rate. It has also overcome a problem characterizing conventional denitrification techniques: the denitrification is inhibited once $NO_2^-$—N exceeds 30 mg/L.
7) The invention can greatly reduce oxygen demand and organic source for denitrification.
8) The activated sludge can be easily cultivated in large quantities due to short start-up time, flexible operation and simple control.
9) Sludge bulking does not occur, and sludge can be separated without requiring any sludge settling tank.

Detailed descriptions of the embodiments of the invention are presented below. However, it should be noted that the invention is not limited to the embodiments presented below, but defined by the accompanying claims.

BRIEF DESCRIPTION OF THE ACCOMPANYING DRAWINGS

PREFERRED EMBODIMENTS

Figure 1:
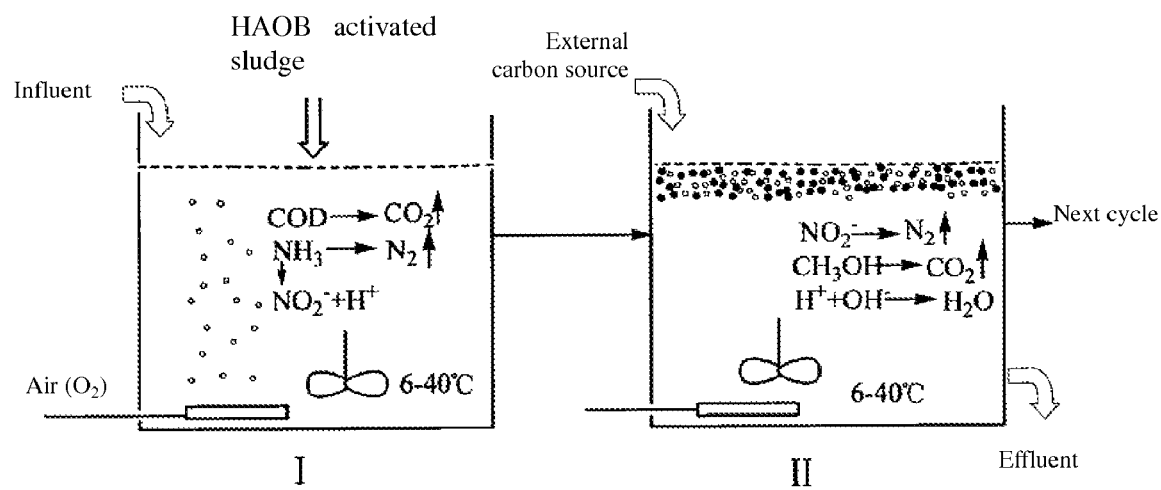
FIG. 1 illustrates the process of carbon and nitrogen removal in a single SBR reactor according to the present invention.

The physicochemical properties of the seeded soil were listed in Table 4. Neither specific feature nor specific source of the soil was required.
(1) Yutu Soil It is named medium loamy yellow fluvo-aquic soil in soil categorization.

The soil was sampled from tillage soils in Zhaogang village, Fengqiu county, Henan province, China (GPS: 35.2°N, 114.5'E)

Physicochemical properties were as follows:

TABLE 4

Physicochemical Properties of the Yutu sample

| Organic matter (%) | Total N (N %) | Total P ($P_2O_5$ %) | Total K ($K_2O$ %) | pH (Water extraction) | $CaCO_3$ (%) |
|---|---|---|---|---|---|
| 1.57 | 0.092 | 0.178 | 2.26 | 8.34 | 10.51 |

CEC $Cmol^{(+)}kg^{-1}$ 19.13, soil texture: silty clay loam (2) Wushantu Soil

It is named neutral gley like paddy soil in soil categorization.

The soil was sampled from tillage soils in Xinzhuang village, Changshu city, Jiangsu province, China.
(GPS:31.33·N, 123·38'E)

Physicochemical properties were as follows:

TABLE 5

Physicochemical Properties of the Wushantu sample

| Organic matter (%) | Total N (N %) | Total P ($P_2O_5$ %) | Total K ($K_2O$ %) | pH (Water extraction) | $CaCO_3$ (%) |
|---|---|---|---|---|---|
| 3.74 | 0.192 | 0.160 | 2.16 | 7.41 | 0.03 |

CEC Cmol$^{(+)}$kg$^{-1}$ 19.13, soil texture: silty clay loam

The numbers of microorganisms in the soil sample before and after cultivation were shown in Table 6.

TABLE 6

Number of microorganisms before and after the cultivation

| | Fresh soil (0 days cultivation) | | | After cultivation of 24 days in inorganic media | | |
|---|---|---|---|---|---|---|
| Soil sample | MPN per gram of dry soil① | Total bacteria number per gram of dry soil② | Ratio of nitrifying heterotrophs to total bacteria number③ | MPN per gram of dry soil | Total bacteria number per gram of dry soil | Ratio of nitrifying heterotrophs to total bacteria number |
| Yutu | $8.52 \times 10^6$ | $2.71 \times 10^6$ | 55.3% | $6.0 \times 10^{10}$ | $5.9 \times 10^{10}$ | 46.7% |
| Wushantu | $7.2 \times 10^3$ | $3.11 \times 10^7$ | 33.0% | $3.4 \times 10^{10}$ | $3.05 \times 10^{10}$ | 50.0% |

① Modified Stephenson medium is used
② PM plate (beef extract-peptone-agar plate)
③ Chinese patent (Pat. No. 03118598.3, CN1187440C) "Separation, identification and purification of heterotrophic nitrification microorganisms"

The source of the wastewater and their compositions were shown below. The invention was not limited to any specific component or concentration:

(A) Modeled Wastewater with High Carbon and Nitrogen Concentrations

| Yeast extract | Trypone | $(NH_4)_2SO_4$ |
|---|---|---|
| 2.36 g | 2.36 g | 2.50 g |

The solution was prepared by tap water; Organic substances were heat to dissolve and diluted to 2500 ml; pH was adjusted to the range 7.0~7.2; CODcr=$1.99 \times 10^3$ mg/L, TKN=424 mg/L, $NH_4^+$-N=212 mg/L.

(B) Modeled Municipal Sewage

The concentration of the solution prepared in step (A) was diluted to one-tenth with water, such that CODcr=$1.99 \times 10^2$ mg/L, TKN=42.4 mg/L, $NH_4^+$—N=21.2 mg/L.

(C) Modeled High-Concentrated Fertilizer Wastewater

The solution was prepared by urea, $(NH_4)_2SO_4$ and tap water without sterilization. TKN=1000N mg/L, in which urea nitrogen=$NH_4^+$—N=500 mg/L; pH~7.0.

(D) Industrial Wastewater: Monosodium Glutamate

The high concentration wastewater was sampled from the raw wastewater from a monosodium glutamate manufacturing company in Jiangsu province, China. The wastewater was treated in an SBR reactor. Characteristics of the wastewater were shown in Table 7.

TABLE 7

Characteristics of the monosodium glutamate wastewater

| COD (mg/L) | BOD (mg/L) | $NH_4^+$—N (TKN) (mg/L) | $SO_4^{2-}$ (mg/L) | pH |
|---|---|---|---|---|
| $4.5 \times 10^4$ | $1.2 \times 10^4$ | $1.0 \times 10^4$ | | 6.0-6.5 |

The raw wastewater was diluted to make $NH_4^+$—N concentration about 500-600 mg/L or 1500-1800 mg/L before put into the SBR described in the invention.

(E) Industrial Wastewater: Coking Wastewater

The wastewater was sampled from a steel group in Nanjin, Jiangsu province, China. The monthly average contaminant compositions were shown in Table 8:

TABLE 8

Characteristics of the coke wastewater

| Volatile Phenol (mg/L) | Cyanide (mg/L) | COD (mg/L) | $NH_4^+$—N (TKN) (mg/L) | color | pH | SCN (mg/L) |
|---|---|---|---|---|---|---|
| 156-289 | 10-20 | 1081 | 330-511 | Transparent, light brown | 7-10 | ~300 |

Figure 2:
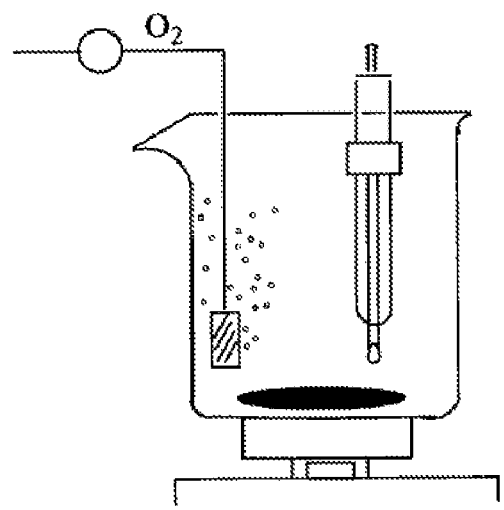
FIG. 2 illustrates the apparatus for bench experiment.

The experiments were carried out in reactors similar to the SBR which were described as follows:

Reactor setup with a beaker: As shown in FIG. 2, a 3 L beaker with an effective volume of 2.5 L was used as a reactor; the reactor was constantly stirred by a magnetic stirrer; and aeration was carried out using an aeration pump (power: 2.5 W) with a sintered sand core air diffuser; A thermostatic bath (SDC-6 model) enabled the reactor to maintain a constant temperature of 28±0.5° C. or 15±0.5° C.

Reactor setup with a bucket: A 150 L PVC bucket with an effective volume of 100 L, equipped with a mechanical agitator with a constant rotation speed of 60 rpm, was used as a reactor. Air was supplied by an electromagnetic air compressor and 6 sintered sand core air diffusers, with a 40 L/min air flowrate. The experiments were carried out at temperatures 15±2° C. and 30±2° C. in different seasons, respectively.

All units in the experiment complied with national standards or industry standard in the absence of national standards. For example, 60.0 mg N/L of nitrite would represent 60 mg nitrite in every liter of solution and 0.18 mg N/L of nitrate would represent 0.18 mg nitrate in every liter of solution.

If the experiment conditions and methods were not specifically described in the experiments below, it was understood that they were carried out under conventional conditions and methods. For example, methods described in "Experimental Methods for Soil Microorganism" (Compiled by the Research Center for Soil Microorganism [Japan], translated by Ye Weiqing etc. Science Press, 1983); "Manual for Research Methods of Soil Microorganism" (Xu Guanghui, Beijing Agricultural Press, 1986); "Research Methods for Methods for Soil Microorganism" (Compiled by the Research Center for Soil Microorganism [Japan], translated by Ye Weiqing etc. Science Press, 1983); "Manual for Research Methods of Soil Microorganism" (Xu Guanghui, Beijing Agricultural Press, 1986); "Research Methods for Soil Microorganism" (Compiled by the Institute of Soil Science, Chinese Academy of Sciences, Science Press, 1985); and "Research Methods for Water Quality" (Compiled by the Japanese Industrial Water Usage Association, translated by Chen Iv-an, Chinese Environmental Science Press, 1990) etc. Certain methods and conditions were determined according to the suggestions of manufacturers.

EXAMPLE 1

This example used Wushantu as seed in the sludge cultivation process.

The comnosition of the organic nre-culture medium used for HAOB cultivation was listed below:

| Yeast Extract | Trypon | $(NH_4)_2SO_4$ | $NaH_2PO_4$ | $K_2HPO_4$ | $FeSO_4 \cdot 7H_2O$ | $MnSO_4 \cdot H_2O$ | $MgSO_4 \cdot 7H_2O$ |
|---|---|---|---|---|---|---|---|
| 2.36 g | 2.36 g | 2.50 g | 0.63 g | 1.80 g | 0.03 g | 0.03 g | 0.09 g |

The culture substrate was prepared by dissolving the organic pre-culture medium with tap water and heating, and then diluted to 2500 ml; pH was adjusted to the range of 7.0-7.2; CODcr=$1.99 \times 10^3$ mg/L, TKN=TN=424 mg/L; organic N: inorganic N=1:1.

5g dry Wushantu was seeded into the above 2500 ml culture substrate (TKN=424 mg/L). Continues aeration was carried out at 28° C. for 2 days until $NO_2^-$—N reached 0.5-1.0 mg/L. Acetic acid (HAc) or sodium acetate (NaAc) as carbon source was added into the solution twice every day (every 12 hours). The carbon source amount each time was 0.28 ml anhydrous HAc per liter solution or 0.40 g anhydrous NaAc per liter solution, corresponding to an equivalent COD concentration of 316 mg/L. According to pH variation, HAc or NaAc was added alternatively to maintain the pH between 6.5 and 8.5.

$NO_2^-$—N was observed to accumulate (5 mg/L) after the 12th addition of carbon source under aeration conditions. Carbon addition was carried out in a total of 18 times or 9 days. On the ninth day, 12 hours after the second addition of carbon source, $NO_2^-$—N accumulation reached 75 mg/L or even higher. Up till then, total COD (including all the carbon source added and those in the medium) had reached 7688 mg/L and aeration time had amounted to 11 days.

Then anoxic denitrification was started. Aeration was stopped, and methanol and anhydrous NaAc were added according to the $NO_2^-$—N concentration with chemical stoicheiometry COD: $NO_2^-$—N=2.4:1, which was an experimental data and was different from the 1.71:1 ratio in theory. Methanol was added according to mass ratio $CH_3OH$: $NO_2^-$—N=2.4:1 (experimental data) or anhydrous NaAc was added according to mass ratio NaAc:$NO_2^-$—N=4.57:1 (experimental data). The mixture was then stirred to perform denitrification. A large amount of small bubbles were observed followed by sludge flotation. Once $NO_2^-$—N fell below 0.5 mg/L, denitrification was stopped.

Aeration could be continued to completely oxidize $NH_4^+$ into $NO_2^-$ if there was still $NH_4^+$ remaining No carbon addition was required in the process and the denitrification process mentioned above could be repeated for several times once $NO_2^-$ accumulation had reached a certain level. The end of the cultivation was marked by the fall of $NH_4^+$—N, $NO_2^-$—N and $NO_3^-$—N concentrations, each to below 1 mg/L. The sludge obtained could be used to treat all kinds of wastewater.

The cultivation process mentioned above could be successfully carried out in the bucket reactor (150 Liter) as well as the previous beaker reactor. The sludge forms flocs and had good settleability.

COMPARATIVE EXAMPLE

The comparative examples compared the activity of nitrogen conversion by ammonia oxidizing bacteria at different temperatures in a single sequencing batch cultivation process when heterotrophic and autotrophic culture mediums were applied.

Two kinds of soil samples were separately seeded into the culture substrate mentioned in Example 1 (heterotrophic culture substrate, represented by H in Tables 9 and 10) and modified inorganic Stephen culture medium (autotrophic culture substrate, represented by A in Tables 9 and 10). The amounts were 2.0 gram dried soil per liter solution. Both examples were carried out using single sequencing batch cultivation at 28° C. in the same reactor and under the same conditions. Apart from applying NaOH to adjust acidity, no organic carbon source was added.

The modified Stephenson cultivation medium was as follows with TN=$NH_4^+$—N=400 mg/L and without sterilization:

| $(NH_4)_2SO_4$ | $NaH_2PO_4$ | $K_2HPO_4$ | $MgSO_4·7H_2O$ | $MnSO_4·H_2O$ | $FeSO_4·7H_2O$ | Tap water | pH |
|---|---|---|---|---|---|---|---|
| 5.0 g | 0.625 g | 1.875 g | 0.075 g | 0.025 g | 0.025 g | 2500 mL | 7.0~7.2 |

Table 9 compared the nitrogen conversions in two different culture substrates.

TABLE 9

Nitrogen conversion rates for Yutu and Wushantu at 28° C. in different culture substrates

| Inoculum | culture substrate | Temperature (° C.) | Ammonification time (days) [1] | Ammonia oxidation time (days) [2] | Nitrite oxidation time (days) [3] | Denitrification time (days) [4] |
|---|---|---|---|---|---|---|
| Yutu Soil | H | 28 | 2 | 10 | 10 | 2.5~3.0 |
|  | A | 28 | — | 14 | 14 | >5 |
| Wushantu Soil | H | 28 | 2 | 10 | 10 | 2.5~3.0 |
|  | A | 28 | — | 14 | 14 | >5 |

[1] Ammonification time-Time needed for ammonification of organic nitrogen until the Griess-Ilosvay reagent test began to show positive and $NO_2^-$—N < 0.2 mg/L.
[2] Ammonia oxidation time-Time needed until the Nessler's reagent test was negative and the Griess-Ilosvay reagent test was positive, indicating the disappearance of ammonia.
[3] Nitrite oxidation time-Time needed until both the Nessler's reagent test and the Griess-Ilosvay reagent test were negative and the diphenylamine reagent test was positive, indicating both $NH_4^+$—N and $NO_2^-$—N less than 0.2 mg/L.
[4] Denitrification time-Time needed until the diphenylamine reagent test and Griess-Ilosvay reagent test were both negative.

The results shown in the tables above indicated that the rate of nitrification and denitrification in the heterotrophic culture substrate exceeded that in the autotrophic culture substrate. The sludge in the heterotrophic culture substrate formed flocs but the sludge in the autotrophic culture substrate was small and had poor settleability which was in accordance with reported results.

Similar operations were carried out at 15° C., and cultivated for 35 days (Table 10)

TABLE 10

Nitrification for Yutu and Wushantu at 15° C. in different culture substrates

| Inoculum | culture substrate | Cultivation temperature(° C.) | $NO_2^-$—N(mg/L) | $NO_3^-$—N(mg/L) |
|---|---|---|---|---|
| Yutu soil | H | 15 | <1 | <1 |
|  | A | 15 | <1 | <1 |
| Wushantu soil | H | 15 | <1 | <1 |
|  | A | 15 | <1 | <1 |

H—Heterotrophic culture substrate; A—Autotrophic culture substrate

The results show that at low temperatures, cell growth was very poor with loosely organized particle formation in both heterotrophic and autotrophic culture substrates. No nitrification, in other words no accumulation of $NO_2^-$—N and $NO_3^-$—N, occurred.

It was indicated that when single sequencing batch cultivation was applied, nitrification rate in either inorganic or organic culture substrates was extremely slow and the activated sludge was hard to obtain, which is in accordance with previous reports.

EXAMPLE 2

Example 2 describes the application of the activated sludge seeded from Wushantu in example 1 to treat modeled wastewater of high organic carbon and nitrogen concentration.

The activated sludge seeded from Wushantu in example 1 was taken as inoculums. The process was performed according to the flow chart shown in FIG. 1: Reaction was stopped when ammonia fell below 3 mg/L (no $NO_2^-$—N or $NO_3^-$—N accumulation); water was discharged and the sludge was left. The process was repeated continuously for 12 months, during which no sludge was discharged. Related technical parameters and treatment results were shown in Table 11.

TABLE 11

Technical parameters for consecutive treatment of modeled wastewater with high organic carbon and nitrogen wastewater (TKN = 424) using activated sludge seeded from Wushantu

| Times of continuous treatment | 1st time | 2nd time | 3rd time | 4th time | 5th time |
|---|---|---|---|---|---|
| Initial sludge concentration (mg/L) | 2000 | | | | |
| Raw wastewater | Modeled wastewater of high organic carbon and nitrogen concentration(TKN = 424 mg/L) | | | | |
| Temperature (° C.) | 28.0 | 28.0 | 28.0 | 28.0 | 28.0 |
| Time    Total HRT | 105 | 70.5 | 47.5 | 36.5 | 36.4 |

TABLE 11-continued

Technical parameters for consecutive treatment of modeled wastewater with high organic carbon and nitrogen wastewater (TKN = 424) using activated sludge seeded from Wushantu

| Times of continuous treatment | | $1^{st}$ time | $2^{nd}$ time | $3^{rd}$ time | $4^{th}$ time | $5^{th}$ time |
|---|---|---|---|---|---|---|
| Lapse (hrs) | Ammonification | 13.5 | 11 | 8 | 5.5 | 5.3 |
| | Ammonia oxidation to nitrite | 84 | 55.25 | 36.5 | 28 | 28 |
| | Aeration | 97.5 | 66.25 | 44.25 | 33.5 | 33.3 |
| | Non-aeration | 7.5 | 4.25 | 3.25 | 3.0 | 3.1 |
| | Ammonia oxidation to nitrite/Non-aeration | 11.2:1 | 15.5:1 | 13.6:1 | 11.2:1 | 11:1 |
| Total carbon source consumption (anhydrous NaAc) (g) | | 3.2 | 2.95 | 3.15 | 3.15 | 3.15 |
| Total $NO_2^-$—N accumulation (mg/L) | | 218 | 310 | 315 | 330 | 330 |
| Sludge volume after 30 mins settling (mL) | | ~200 | 250~300 | ~350 | ~400 | ~400 |

It could be concluded from Table 11 that during the consecutive treatment of modeled wastewater of high organic carbon and nitrogen concentration at 28° C. with 2000 mg/L seeded activated sludge and a single air diffuser, the total HRT, aeration time and non-aeration time significantly decreased with the increase of consecutive treatment times. Sludge volume, however, underwent slight increase until it was stabilized after the fourth continuous treatment cycle. About 22.2% of ammonia was oxidized to $N_2$ and dissipated while the rest of the ammonia was removed through denitrification.

TABLE 12

Comparison of Concentrations between Influent (i.e., the wastewater before the treatment) and Effluent (i.e., the wastewater after the treatment)

| | Items | | | | |
|---|---|---|---|---|---|
| Indexes | COD | TKN mg/L | $NH_4^+$—N | $NO_2^-$—N | $NO_3^-$—N |
| Influent | $1.99 \times 10^3$ | 424 | 212 | 0 | 0 |
| Effluent | 38 | <10 | <3 | <0.5 | 0 |

Effluent indexes substantially decreased (Table 12), thus the method proposed by the invention had effectively removed carbon and nitrogen from the wastewater.

EXAMPLES 3~5

Examples 3~5 described the application of the activated sludge seeded from Wushantu to treat monosodium glutamate wastewater, modeled fertilizer wastewater and modeled municipal wastewater in the same manner as example 2.

TABLE 13

Technical Parameters for the consecutive treatment of wastewater with the activated sludge seeded from Wushantu at different temperatures
Single air diffuser

| | | Example 3 | Example 4 | Example 5 | | | | | |
|---|---|---|---|---|---|---|---|---|---|
| Raw wastewater | | Monosodium glutamate wastewater (500 mg N/L) | Simulated fertilizer wastewater 1000 mgN/L | Modeled municipal wastewater 42.4 mg N/L | | | | | |
| Times of consecutive treatment | | | | | $1^{st}$ time | $2^{nd}$ time | $3^{rd}$ time | $4^{th}$ time | $5^{th}$ time |
| Temperature ° C. | | 28 | 28 | 28 | 15 | 15 | 15 | 15 | 15 |
| Time lapse (hrs) | Total HRT | 71.9 | 95.7 | 6.67 | 19.5 | 14.03 | 13.5 | 13.5 | 13.5 |
| | Ammonification | 3.5 | 0 | 0 | 0 | 0 | 0 | 0 | 0 |
| | Ammonia oxidation to nitrite | 63.5 | 84.05 | 6.25 | 17.33 | 12.36 | 12.0 | 12.0 | 12.0 |
| | Aeration | 67 | 84.05 | 6.25 | 17.33 | 12.36 | 12.0 | 12.0 | 12.0 |
| | Non-aeration | 4.87 | 11.62 | 0.42 | 2.17 | 1.67 | 1.5 | 1.5 | 1.5 |
| | Ammonia oxidation to nitrite /non-aeration | 13.0:1 | 7.23:1 | 14.9:1 | 7.98:1 | 7.40:1 | 8.0:1 | 8.0:1 | 8.0:1 |

TABLE 13-continued

Technical Parameters for the consecutive treatment of wastewater with
the activated sludge seeded from Wushantu at different temperatures
Single air diffuser

|  | Example 3 | Example 4 | Example 5 | | | | | |
|---|---|---|---|---|---|---|---|---|
| Total carbon source consumption (anhydrous NaAc) (g) | 4.3 | 9.35 | 0.4 | 0.5 | 0.5 | 0.5 | 0.5 | 0.5 |
| Total $NO_2^-$—N accumulation (mg/L) | 420 | 900 | 35 | 35 | 35 | 35 | 35 | 35 |
| Sludge volume after 30 mins settling (mL) | 400~450 | 400~450 | 400~450 | 400~450 | 400~450 | 400~450 | 400~450 | 400~450 |

It could be concluded that ammonia oxidation with $NO_2^-$—N accumulation as an indicator, was able to take place rapidly. When temperature fell from 28° C. to 15° C., oxidation was still able to occur but the oxidation rate decreased significantly. But as treatment times increased, HAOB were able to quickly adapt to the low temperature, and total biological reaction rate were increased and finally stabilized.

EXAMPLES 6~10

Examples 6~10 discussed the optimal temperature range and amount of seeded activated sludge most advantageous for the process. All the conditions in examples 6-10 were similar to examples 2-5, except that initial sludge concentration was 6000 mg/L whereas in examples 2~5 2000 mg/L was applied.

Table 14 showed the water treatment results at different temperatures using a single air diffuser when activated sludge amount was increased.

From comparison of Tables 14, 11 and 13, we could see that the increase of activated sludge could significantly improve treatment efficiency, and shorten total HRT, aeration time and non-aeration time. For continuous treatment of modeled municipal wastewater at low temperatures, the treatment efficiency was comparable to that of 28° C. after a short period of adaptation. This reflected one of the core principals mentioned in this invention: removal of carbon and nitrogen under no-cell growth conditions.

Tables 15 and 16 show the results of treating modeled wastewater of high organic carbon and nitrogen concentration and modeled fertilizer wastewater with different sludge concentrations using a single air diffuser at 28° C.

TABLE 14

Technical parameters for the consecutive treatment of various wastewaters at different
temperatures using high concentrated activated sludge seeded from Wushantu
Single air diffuser

|  |  | Example 6 | Example 7 | Example 8 | Example 9 | Example 10 | | | |
|---|---|---|---|---|---|---|---|---|---|
| Initial sludge concentration (mg/L) | | 6000 | | | | | | | |
| raw wastewater | | Modeled organic carbon and nitrogen wastewater (424 mg N/L) | Monosodium glutamate wastewater (500 mg N/L) | Modeled fertilizer wastewater (1000 mgN/L) | Modeled municipal wastewater (42.4 mg N/L) | | | | |
| Times of continuous treatment cycle | | | | | | $1^{st}$ time | $2^{nd}$ time | $3^{rd}$ time | $4^{th}$ time |
| Temperature ° C. | | 28 | 28 | 28 | 28 | 15 | 15 | 15 | 15 |
| Time lapse (hrs) | Total HRT | 45.6 | 51.6 | 79 | 3 | 13 | 11 | 5.75 | 4.67 |
|  | Ammonification | 10 | 3 | 0 | 0 | 0 | 0 | 0 | 0 |
|  | Ammonia oxidation to nitrite | 32.5 | 44.25 | 70.11 | 2.67 | 11.4 | 10.17 | 5.0 | 4.17 |
|  | Aeration | 42.5 | 47.25 | 70.11 | 2.67 | 11.4 | 10.17 | 5.0 | 4.17 |
|  | Non-aeration | 3.1 | 4.35 | 8.89 | 0.33 | 1.6 | 0.83 | 0.75 | 0.5 |
|  | Ammonia oxidation to nitrite/non-aeration | 10.5:1 | 10.17:1 | 7.89:1 | 8.09:1 | 7.13:1 | 12.25:1 | 6.66:1 | 8.34:1 |
| Total carbon source consumption (anhydrous NaAc) (g) | | 3.15 | 4.2 | 9.35 | 0.3 | 0.4 | 0.4 | 0.4 | 0.4 |
| Total $NO_2^-$—N accumulation (mg/L) | | 340 | 415 | 920 | 35 | 35 | 35 | 35 | 35 |
| Sludge volume after 30 mins settling (mL) | | 900 | ~700 | ~750 | ~750 | ~750 | ~750 | ~750 | ~750 |

TABLE 15

Technical parameters for treating modeled wastewater of high organic carbon
and nitrogen concentration with different activated sludge concentrations
28° C., activated sludge seeded from Wushantu, single air diffuser

| Inoculation amount MLSS | Total HRT | TN removal rate | Specific TN removal activity | Time for ammonia oxidation to nitrite (hrs) | Specific ammonia oxidation activity (mgN · g$^{-1}$ · h$^{-1}$) | |
|---|---|---|---|---|---|---|
| g · L$^{-1}$ | (hrs) | (mgN · h$^{-1}$) | (mgN · g$^{-1}$ · h$^{-1}$) | | mgN · g$^{-1}$ · h$^{-1}$ | mgN · g$^{-1}$ · d$^{-1}$ |
| 2 | 70.5 | 6.01 | 3.00 | 55.25 | 3.83 | 91.9 |
| 6 | 45.6 | 9.29 | 1.54 | 32.5 | 2.17 | 52.1 |

Total HRT = Aeration time + Non-aeration time;
TN removal rate = Total nitrogen amount in the influent (mg)/Total HRT (hrs);
Specific TN removal activity = TN removal rate (mgN · h$^{-1}$)/Total amount of sludge or MLSS (g);
Specific ammonia oxidation activity = Total nitrogen amount in the influent (mg)/(Time for ammonia oxidation to nitrite (hrs) × total amount of sludge (g)).

TABLE 16

Technical parameters for treating modeled fertilizer wastewater
with different activated sludge concentrations
28° C., activated sludge seeded from Wushantu, single air diffuser

| Inoculation amount MLSS | Total HRT | TN removal rate | Specific TN removal activity | Time for ammonia oxidation to nitrite (hrs) | Specific ammonia oxidation activity (mgN · g$^{-1}$ · h$^{-1}$) | |
|---|---|---|---|---|---|---|
| g · L$^{-1}$ | (hrs) | (mgN · h$^{-1}$) | (mgN · g$^{-1}$ · h$^{-1}$) | | mgN · g$^{-1}$ · h-1 | MgN · g$^{-1}$ · d$^{-1}$ |
| 2 | 95.7 | 10.45 | 5.22 | 84.05 | 5.95 | 142.8 |
| 6 | 79.0 | 12.66 | 2.11 | 70.1 | 2.38 | 57.12 |

Tables 15 and 16 showed that in the treatment of modeled wastewater of high organic carbon and nitrogen concentration and modeled fertilizer wastewater, HRT, TN removal rate and time for ammonia oxidation to nitrite were substantially improved when sludge concentration was increased. Nevertheless, the specific TN removal activity and ammonia oxidation activity decreased significantly.

Similarly, the operations of modeled municipal wastewater with different activated sludge concentrations at 15° C. were shown in table 17.

Total HRT, TN removal rate and Time for ammonia oxidation to nitrite were significantly improved in proportion to the increase of seeded sludge. However, specific ammonia oxidation activity and specific total nitrogen removal activity slightly decreased.

EXAMPLES 11~12

Oxygen solubility in water at different temperatures was shown in Table 18.

TABLE 17

Technical parameters for treating modeled municipal wastewater
with different activated sludge concentrations at 15° C.
15° C., activated sludge seeded from Wushantu, single air diffuser

| Inoculation amount MLSS | Total HRT | TN removal rate | Specific TN removal activity | Time for ammonia oxidation to nitrite (hrs) | Specific ammonia oxidation activity | |
|---|---|---|---|---|---|---|
| g · L$^{-1}$ | (hrs) | (mgN · h$^{-1}$) | (mgN · g$^{-1}$ · h$^{-1}$) | | mgN · g$^{-1}$ · h$^{-1}$ | mgN · g$^{-1}$ · d$^{-1}$ |
| 2 | 13.5 | 3.14 | 1.57 | 12.0 | 1.76 | 42.39 |
| 6 | 4.67 | 9.07 | 1.51 | 4.17 | 1.69 | 40.67 |

TABLE 18

Values of saturated dissolved oxygen (DO) as a function of temperature under standard atmospheric pressure

| Temperature ° C. | 0 | 5 | 10 | 15 | 20 | 25 | 30 | 35 | 40 |
|---|---|---|---|---|---|---|---|---|---|
| Saturated DO (mg/L) | 14.62 | 12.80 | 11.33 | 10.15 | 9.17 | 8.38 | 7.63 | 7.10 | 6.60 |

Saturated DO significantly increased with the decrease of temperature which resulted in the insignificant difference of specific TN removal activity and specific ammonia oxidation activity under different sludge concentrations as shown in Examples 6~10.

Therefore, we could deduce that the fundamental reason of the decreases of TN removal activity and ammonia oxidation activity was the low oxygen transfer efficiency in high concentrations of sludge. Increase in oxygen supply or the adoption of high efficient air diffusers might increase DO and improve oxygen transfer efficiency to achieve effective removal of carbon and nitrogen.

Example 11 compared the results of treating modeled wastewater of high organic carbon and nitrogen concentration with different aeration and different sludge concentrations.

TABLE 19

Technical parameters for the treatment of modeled wastewater of high organic carbon and nitrogen concentration with different aeration and different sludge concentrations 28° C., activated sludge seeded from Wushantu

| | Number of air diffusers | 1 | 2 | 1 | 3 |
|---|---|---|---|---|---|
| Sludge concentration (mg · L$^{-1}$) | | 2000 | 2000 | 6000 | 6000 |
| Raw wastewater | | \multicolumn{4}{c}{modeled wastewater of high organic carbon and nitrogen concentration (TKN = 424 mg/L)} | | | |
| Temperature ° C. | | 28 | 28 | 28 | 28 |
| Time (hrs) | HRT | 70.5 | 48.82 | 45.1 | 20.08 |
| | Ammonification | 11 | 7.5 | 10 | 5.1 |
| | ammonia oxidation to nitrite | 55.25 | 36.9 | 32.5 | 10.68 |
| | Aeration | 66.25 | 44.38 | 42.5 | 16.78 |
| | Non-aeration | 4.25 | 4.42 | 3.1 | 3.3 |
| | ammonia oxidation to nitrite/Non-aeration | 11.2:1 | 8.35:1 | 10.17:1 | 5.06:1 |
| Total carbon source consumption (anhydrous NaAc) (g) | | 2.95 | 3.0 | 3.15 | 3.15 |
| Total NO$_2^-$—N accumulation (mg/L) | | 310 | 310 | 340 | 330 |
| Sludge volume after 30 mins settling (mL) | | 250~300 | ~350 | 900 | 850~900 |

Example 12 compared the results of treating modeled fertilizer wastewater with different aeration and different sludge concentrations (Table 20).

TABLE 20

Technical parameters for the treatment of modeled fertilizer wastewater with different aeration and different sludge concentrations 28° C., activated sludge seeded from Wushantu

| | Number of air diffusers | 1 | 2 | 1 | 3 |
|---|---|---|---|---|---|
| Sludge concentration (mg · L$^{-1}$) | | 2000 | 2000 | 6000 | 6000 |
| Raw wastewater | | \multicolumn{4}{c}{Modeled fertilizer wastewater (TKN = 1000 mg/L)} | | | |
| Temperature ° C. | | 28 | 28 | 28 | 28 |
| Time (hrs) | HRT | 95.7 | 68.06 | 79.0 | 32.87 |
| | Ammonification | 0 | 0 | 0 | 0 |
| | ammonia oxidation to nitrite | 84.05 | 56.06 | 70.1 | 23.7 |
| | Aeration | 84.05 | 56.06 | 70.1 | 23.7 |
| | Non-aeration | 11.62 | 12.0 | 8.89 | 9.17 |
| | ammonia oxidation to nitrite/Non-aeration | 7.23:1 | 4.67:1 | 7.89:1 | 2.58:1 |
| Total carbon source consumption (anhydrous NaAc) (g) | | 9.35 | 9.30 | 9.35 | 9.35 |
| Total NO$_2^-$—N accumulation (mg/L) | | 900 | ~900 | 920 | 910 |
| Sludge volume after 30 mins settling (mL) | | 400~450 | 400~450 | ~750 | ~750 |

Tables 19 and 20 demonstrated the operation results of treating modeled wastewater of high organic carbon and nitrogen concentration and modeled fertilizer wastewater with different aeration conditions. The improvement of aeration condition could substantially enhance treatment efficiency, reduce total HRT, aeration and non-aeration time, and steadily maintain the ammonia oxidation at the $NO_2^-$—N accumulation stage.

Tables 21 and 22 analyzed the various parameters (TN removal rate, specific TN removal activity and specific ammonia oxidation activity) for treating modeled wastewater of high organic carbon and nitrogen concentration and modeled fertilizer wastewater under different aeration conditions and using different sludge concentrations.

TABLE 21

Technical parameters for the treatment of modeled wastewater of high organic carbon and nitrogen concentration with different aeration conditions
28° C., activated sludge seeded from Wushantu

| Number of air diffusers | Initial MLSS ($g \cdot L^{-1}$) | HRT (hrs) | TN removal rate ($mgN \cdot h^{-1}$) | specific TN removal activity ($mgN \cdot g^{-1} \cdot h^{-1}$) | Time for ammonia oxidation to nitrite (hrs) | specific ammonia oxidation activity | |
|---|---|---|---|---|---|---|---|
| | | | | | | $mgN \cdot g^{-1} \cdot h^{-1}$ | $mgN \cdot g^{-1} \cdot d^{-1}$ |
| 1 | 2 | 70.5 | 6.01 | 3.00 | 55.25 | 3.83 | 91.9 |
| 2 | 2 | 48.82 | 8.68 | 4.34 | 36.9 | 5.09 | 122.2 |
| 1 | 6 | 45.6 | 9.29 | 1.54 | 32.5 | 2.17 | 52.1 |
| 3 | 6 | 20.08 | 21.11 | 3.52 | 10.68 | 6.61 | 158.8 |

TABLE 22

Technical parameters for the treatment of modeled fertilizer wastewater with different aeration conditions
28° C., activated sludge seeded from Wushantu

| Number of air diffusers | Initial MLSS ($g \cdot L^{-1}$) | HRT (hrs) | TN removal rate ($mgN \cdot h^{-1}$) | specific TN removal activity ($mgN \cdot g^{-1} \cdot h^{-1}$) | Time for ammonia oxidation to nitrite (hrs) | specific ammonia oxidation activity | |
|---|---|---|---|---|---|---|---|
| | | | | | | $mgN \cdot g^{-1} \cdot h^{-1}$ | $mgN \cdot g^{-1} \cdot d^{-1}$ |
| 1 | 2 | 95.7 | 10.45 | 5.22 | 84.05 | 5.95 | 142.8 |
| 2 | 2 | 68.06 | 14.69 | 7.34 | 56.17 | ~8.9 | 213.6 |
| 1 | 6 | 79 | 12.66 | 2.11 | 70.1 | 2.38 | 57.12 |
| 3 | 6 | 32.87 | 30.42 | 5.07 | 23.7 | 7.03 | 168.7 |

When aeration conditions were improved and specific TN removal activity and specific ammonia oxidation activity remained constant, high sludge concentration resulted in the significant reduction of total HRT and time for ammonia oxidation to nitrite, and improved TN removal rate.

EXAMPLE 13

1. Activated Sludge Cultivation Using Yutu Soil as Inoculum

The activated sludge cultivation using Yutu soil as inoculum was carried out by the same procedures as that described in Example 1. The cultivation time and amount of carbon source might differ slightly because of the difference in physicochemical properties of the soils, the composition of microorganisms, especially the HAOB species exhibiting high ammonia-to-nitrite oxidation activity. *Bacillus* pseudofirmus NH-2 dominated in Yutu soil while *Arthrobacter* globiformis WR-2 dominated in Wushantu soil.

2. The Consecutive Treatment of Modeled Wastewater of High Organic Carbon and Nitrogen Wastewater Concentration Using Activated Sludge Following the above cultivation approach but at 15° C. in the 150 Liter bucket reactor, Yutu soil was cultivated for 23 days, and then the sludge was filtered and served as inoculum. Table 23 showed the treatment results of modeled wastewater of organic carbon and nitrogen concentration.

TABLE 23

Technical parameters for treating modeled wastewater of high organic carbon and nitrogen concentration
Single air diffuser

| Inoculum | 15° C., 150 Litre reactor, Yutu soil after 23 days of continuous cultivation | |
|---|---|---|
| Initial sludge concentration (mg. L$^{-1}$) | 2000 | |
| Temperature ° C. | 28 | |
| Times of treatment cycle | 1$^{st}$ time | 2$^{nd}$ time |
| Time (hrs)  Total HRT | 155 | 63 |
| Aeration | 126.5 | 53 |
| Non-aeration | 28.5 | 10 |
| Aeration/non-aeration | 1.42:1 | 5.3:1 |
| Total carbon source consumption (anhydrous NaAc) (g) | 7.3 | 4.25 |
| Total NO$_2^-$— N accumulation (mg/L) | 145 | 385 |

Note:
Bacterial growth was poor at 15° C., no accumulation of nitrification products was observed. The filtered sludge was stored in a 4° C. refrigerator before use.

Due to the poor bacterial growth at 15° C., the sludge was further cultivated at 28° C. During the first cultivation, NO$_2^-$—N accumulation was small and bacterial grew (Table 23). This was largely due to the fact that HABO growth is weak at 15° C. The process was carried out in parallel for 6 times.

EXAMPLES 14~18

With the same approach, the sludge produced from example 13 was filtered out. The results of consecutive treatment of various kinds of wastewater using 4000 mg/L activated sludge were shown below:

It should be noted that Yutu soil activated sludge was able to treat wastewater with high ammonia concentration, such as monosodium glutamate wastewater (NH$_3$—N concentration ranging between 500~600 and 1500~1800 ml/L) and modeled fertilizer wastewater. The high concentrations of NH$_3$—N did not inhibit ammonia oxidation as described by conventional methods.

EXAMPLES 19~20

The final filtered sludge produced in Examples 14-18 was used as inoculum to treat modeled municipal wastewater and modeled wastewater of high organic carbon and nitrogen concentration.

TABLE 24

Technical parameters for various wastewater treatments using activated sludge seeded from Yutu soil
Single air diffuser

| | Example 14 | Example 15 | Example 16 | Example 17 | Example 18 |
|---|---|---|---|---|---|
| Innoculum | Sludge cultivated from Example 12 (seeded from Yutu) | | | | |
| Initial sludge concentration mg · L$^{-1}$ | 4000 | | | | |
| Type of wastewater | Modeled wastewater of high organic carbon and nitrogen concentration | Modeled fertilizer wastewater | Monosodium glutamate wastewater of high concentration ① | Monosodium glutamate wastewater of low concentration ② | Modeled municipal wastewater |
| Temperature° C. | 28 | 28 | 28 | 28 | 28 |
| Times of continuous treatment cycle | 1$^{st}$ time  2$^{nd}$ time | | | | |
| Time (hrs)  Total HRT | 50    54 | 113.5 | 188.5 | 72 | 5.5 |
| Aeration | 44    49.3 | 100 | 171.2 | 66.25 | 4.83 |
| Non-aeration | 6    4.7 | 13.5 | 17.3 | 5.75 | 0.67 |
| Aeration/non-aeration | 7.33:1  10.5:1 | 7.41:1 | 9.88:1 | 11.52:1 | 7.21:1 |
| Total carbon source consumption (anhydrous NaAc) (g) | 4.6    4.1 | 8.85 | 13.9 | 4.1 | 0.3 |
| Total NO$_2^-$—N accumulation (mg/L) | 330    355 | 785 | 990 | 385 | 30 |

① Dilute the original monosodium glutamate wastewater with tap water in fold of 6.67. TKN = 1500 mg/L, COD = 46746.6 mg/L, BOD = 1799.1 mg/L;
② Dilute the original monosodium glutamate wastewater with tap water in fold of 20. TKN = 500 mg/L, COD = 2250 mg/L, BOD = 600 mg/L.

TABLE 25

Technical parameters for treating modeled municipal wastewater using activated sludge seeded from Yutu
15° C., Single air diffuser

| Inoculum | Sludge filtered from the process explained in Table 24 | | | |
|---|---|---|---|---|
| Times of consecutive treatment cycle | $1^{st}$ time | $2^{nd}$ time | $3^{rd}$ time | $4^{th}$ time |
| Temperature ° C. | 15 | 15 | 15 | 15 |
| Time Total HRT | 19.5 | 16.1 | 10.8 | 8.1 |
| (hrs) Aeration | 18.3 | 15.1 | 10.0 | 7.3 |
| Non-aeration | 1.2 | 1.0 | 0.8 | 0.8 |
| Aeration/non-aeration | 15.3:1 | 15.1:1 | 12.5:1 | 9.12:1 |
| Total carbon source consumption (anhydrous NaAc) (g) | 0.6 | 0.4 | 0.4 | 0.4 |
| Total $NO_2^-$—N accumulation (mg/L) | 40 | 35 | 35 | 35 |

TABLE 26

Technical parameters for treating modeled wastewater with high organic carbon and nitrogen concentration using different activated sludge concentrations
28° C., Single air diffuser

| Sludge concentration mg/L | 4000 | 6000 | 8000 |
|---|---|---|---|
| Temperature ° C. | 28 | 28 | 28 |
| Time Total HRT | 54 | 38 | 34.6 |
| (hrs) Aeration | 49.3 | 35 | 31.5 |
| Non-aeration | 4.7 | 3.0 | 3.1 |
| Aeration/non-aeration | 10.49:1 | 11.67:1 | 10.16:1 |
| Total carbon source consumption (anhydrous NaAc) (g) | 4.1 | 3.7 | 3.1 |
| Total $NO_2^-$—N accumulation (mg/L) | 355 | 390 | 340 |

The treatment results were comparable or even better than that using activated sludge seeded from Wushantu. The decrease of oxygen transfer due to higher concentrations of sludge could also be avoided by improving aeration conditions to achieve highly effective carbon and nitrogen removal.

EXAMPLE 21

The example related to the biological nitrogen removal of coking wastewater using the methods described in this invention.

Coking wastewater, characterized by high COD and high $NH_3$—N, was a special kind of industrial wastewater that defies other wastewater treatment methods mentioned above and therefore was hard to achieve $NH_3$—N removal.

A steel group in Nanjing, Jiangsu Province used the conventional activated sludge method to treat the dephenolized and ammonia distillated coking wastewater with HRT≧12 hrs. The water quality of the effluent after the aeration was shown in Table 27.

TABLE 27

Treatment results after aeration

| Items | Volatile phenol | $CN^-$ | $SCN^-$ | COD | $NH_3$—N |
|---|---|---|---|---|---|
| Influent mg·$L^{-1}$ | 121.39 | 6.19 | 161.1 | 1081 | 511.0 |
| Effluent mg·$L^{-1}$ | 0.84 | 0.685 | 6.03 | 505 | 386.1 |
| Removal Efficiency % | 99.31 | 88.93 | 96.26 | 53.28 | 24.44 |

The results were similar to other companies' reports: phenol and cyanide concentrations could basically reach the controlled standards while COD and $NH_3$—N exceeded their corresponding limits. Short-cut (or complete) nitrification-denitrification processes were unable to be applied to this kind of wastewater because no nitrification took place in the reactors, therefore ammonia was unable to be removed.

The main reasons are:

① The activated-sludge method is a biological technique intended for the removal of BOD, therefore it is effective in treating biodegradable phenol, cyanide and thiocyanate. It is thus understandable that treatment of refractory complex organic compounds is unsatisfying.

② The 24.4% of $NH_3$—N removal efficiency by activated sludge is actually partially contributed by the release of $N_2$ produced from heterotrophic ammonia oxidation during the non-cell-growth process of HAOB (no sludge was discharged in this treatment process). It is not resulted from air stripping as previously thought.

Dephenolized and ammonia distillated coking wastewater was continuously aerated at 28° C. before being discharged into the biological tank. The activated sludge proposed by the present invention was seeded into the tank. The pH value in the tank experienced continuous declined but the $NH_4^+$—N didn't reduce when volatile phenol reached corresponding standards (the point when $NH_4^+$—N removal reaches about 24%). Then sodium phenolate solution (containing of phenol (analytical grade) and sodium hydroxide), having pH adjusted between 7.0 and 7.5, was added into the reactor every 12 hours. The solution was continuously aerated for 13 days before $NH_4^+$—N was completely removed. No $NO_2^-$—N and $NO_3^-$—N accumulations were detected. This practically confirmed that heterotrophs were able to oxidize $NH_4^+$—N into $N_2$. On the other hand, ammonia removal efficiency was ineffective using this model. The process, besides requiring for COD input, was also time-consuming and consumed a vast amount of oxygen and energy. In all, the process was not applicable to ammonia removal from coking wastewater.

In the activated sludge system, nitrification usually does not occur. This has largely been attributed to the inhibition of ammonia oxidation, especially the organic substances like $CN^-$ and $SCN^-$ inhibit nitrification or the more traditionally called ammonia oxidation process. Further investigations were carried out to see whether nitrification, with $NO_2^-$—N or $NO_3^-$—N accumulation as indicator would took place after inhibitory substances such as $CN^-$ and $SCN^-$ were removed.

The inventor held that the basic cause for the difficulty in $NH_4^+$—N removal was the lack of carbon source needed by HAOB, especially highly active heterotrophs for ammonia oxidation to nitrite, which would prevent the ammonia oxidation. Due to this concern, the inventor designed a process combining continues flow reactor with SBR (FIG. 3).

Figure 3:
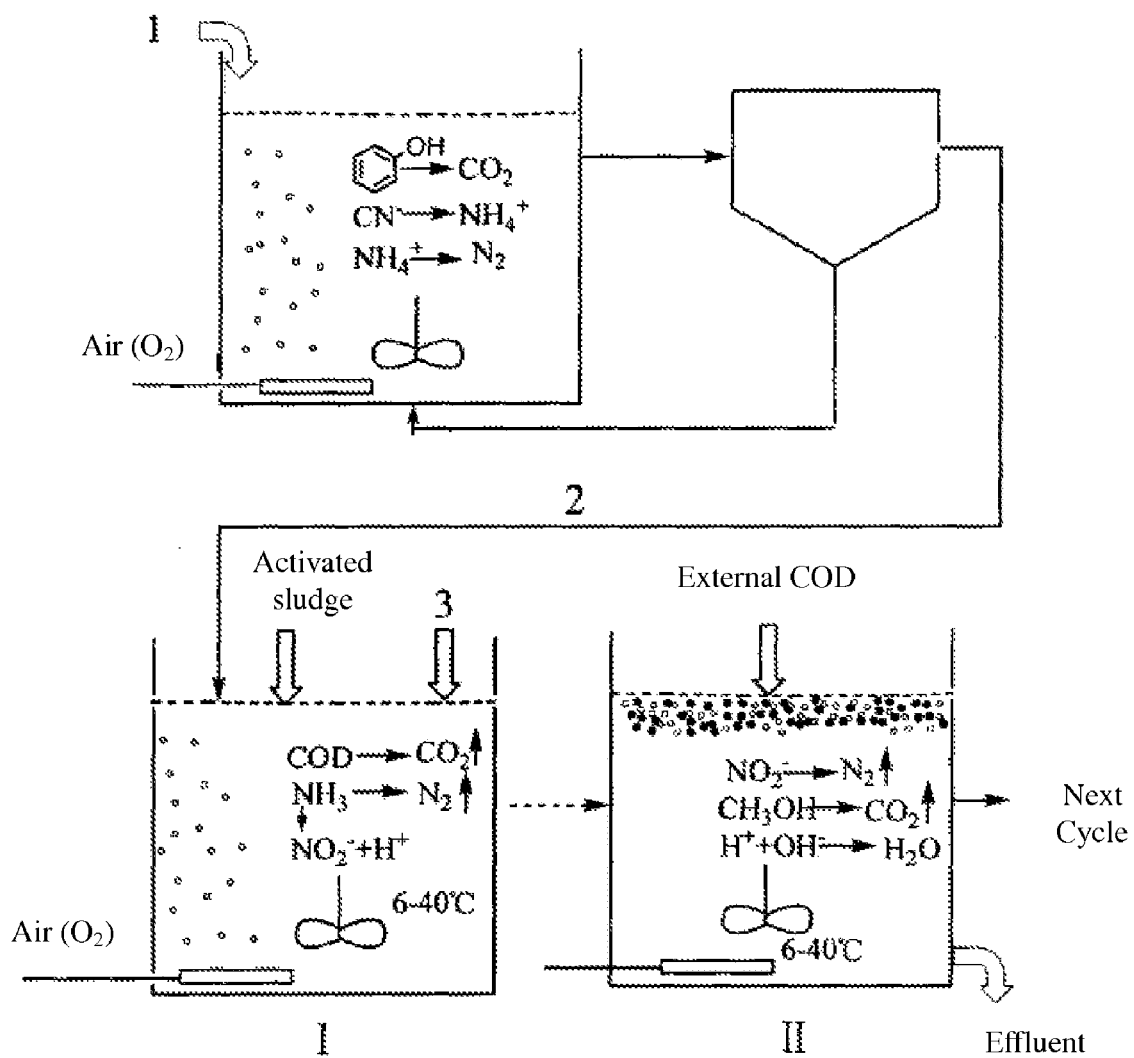
FIG. 3 illustrates the treatment process for coking wastewater by combining continuous flow reactor with SBR.
Figure 4:
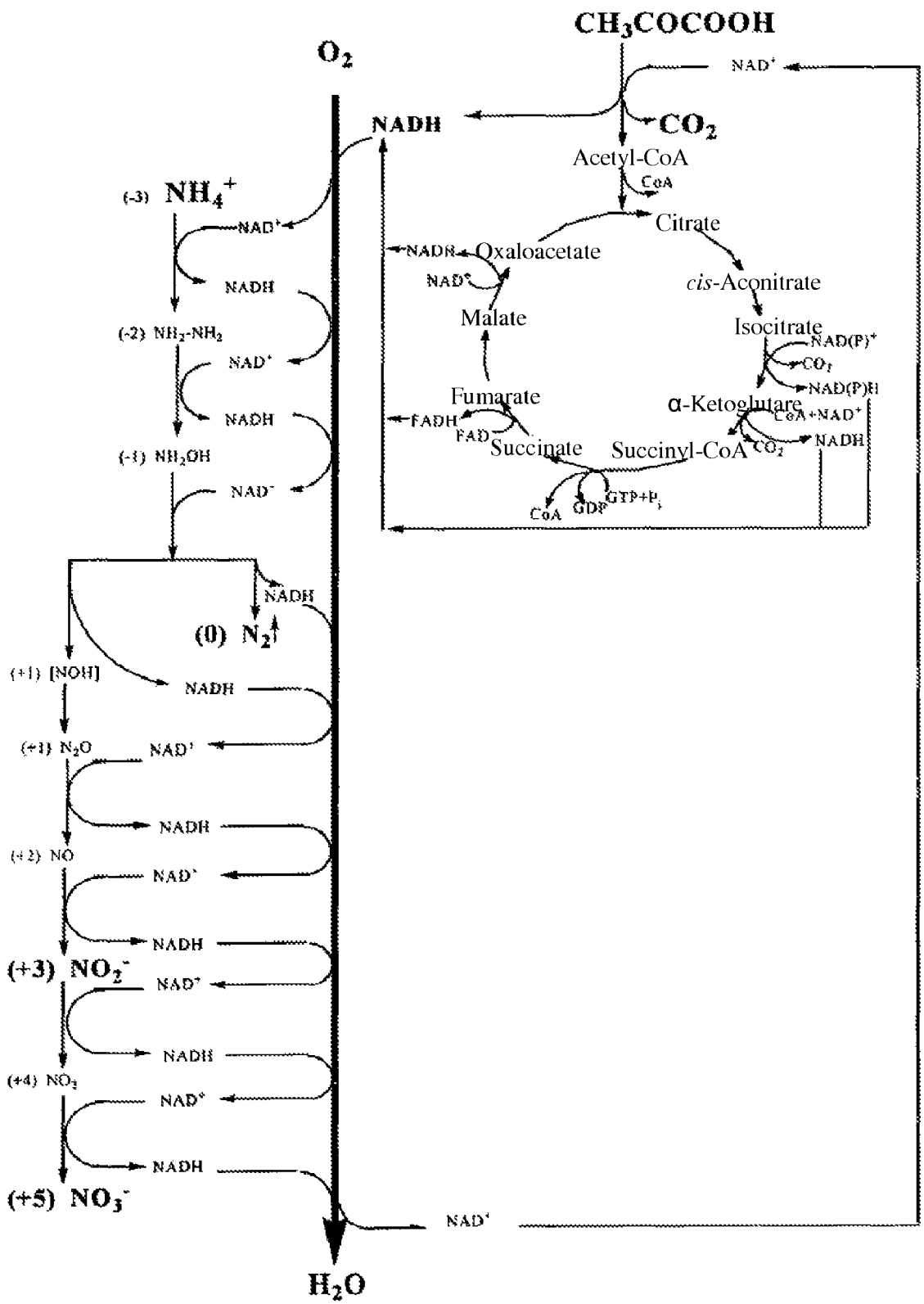
FIG. 4 illustrates the electron transfer process in Krebs cycle and the combined oxidation of carbon and nitrogen.

In the process as shown in FIG. 3, cyanide and cyanate etc was removed from dephenolized and ammonia distilled coking wastewater 1. The effluent 2 after sludge separation contained ammonia and entered the SBR where different concentrations of activated HAOB sludge were seeded. One of the specialties of the process was that organic carbon source 3, no less than 200 mg/L, should be added during aeration. Ammonia oxidation was then carried out and held at the short-cut nitrification stage ($NO_2^-$—N was end product) followed by denitrification after aeration was ceased.

Treatment efficiency was shown in the following table.

TABLE 28

Technical parameters in nitrogen removal process of coke wastewater
Influent: $NH_4^+$—N = 250 mg/L, activated sludge seeded from Wushantu soil, 28° C.

| | Number of air diffusers | 1 | 1 | 3 | 3 |
|---|---|---|---|---|---|
| Sludge concentration(mg/L) | | 2000 | 2000 | 6000 | 6000 |
| Times of continuous treatment cycle | | $1^{st}$ time | $2^{nd}$ time | $1^{st}$ time | $2^{nd}$ time |
| Time (hrs) | Total HRT | 26.25 | 21.95 | 7.88 | 7.71 |
| | Ammonification | 0 | 0 | 0 | 0 |
| | Ammonia oxidation to nitrite | 22.5 | 18.75 | 5.38 | 5.21 |
| | Aeration | 22.5 | 18.75 | 5.38 | ~5.21 |
| | Non-aeration | 3.75 | 3.20 | 2.5 | 2.5 |
| | Aeration/non-aeration | 6.00:1 | 5.86 | 2.15:1 | 2.08:1 |
| Total carbon source consumption (anhydrous NaAc) (g) ① | | 2.57 | 2.57 | 2.57 | 2.57 |
| Total $NO_2^-$—N accumulation (mg/L) | | 225 | 225 | 225 | 225~ |
| Sludge volume after 30 mins' settling(ml) | | ~250 | ~250 | 750 | 750 |

① Only the carbon source applied during denitrification was calculated. The carbon source needed to initiate the nitrification stage was not included.

The COD of the coking wastewater after nitrogen removal was around 300 mg/L, which was above the national standard (150 mg/L). The remaining COD could be treated with Fenton reagent with $Fe^{2+}$ and $H_2O_2$ (30%). When $H_2O_2$ reached 600 mg/L or 900 mg/L, COD fell to the level of 175.7 mg/L and 130.5 mg/L, respectively, which accorded with national standards.

The carbon and nitrogen removal results of various wastewater treated by the method according to the invention was summarized in the Table 29.

TABLE 29

Treatment results using the method according to the invention

| Items Wastewater type | Influent/ Effluent | COD mg·L$^{-1}$ | BOD mg·L$^{-1}$ | TKN mg·L$^{-1}$ | $NH_4^+$—N mg·L$^{-1}$ | $NO_2^-$—N mg·L$^{-1}$ | $NO_3^-$—N mg·L$^{-1}$ |
|---|---|---|---|---|---|---|---|
| Modeled wastewater of high organic carbon and nitrogen concentration | Influent | 1999 | — | 424 | ≧212 | <0.5 | ND |
| | Effluent | <40 | — | ≦10 | ≦3 | <0.5 | ND |
| Modeled fertilizer wastewater | Influent | — | — | 1000 | 500 | <0.5 | ND |
| | Effluent | <10 | — | ≦10 | ≦3 | <0.5 | ND |
| Modeled municipal wastewater | Influent | 199 | — | 42.4 | ≧21.2 | <0.5 | ND |
| | Effluent | <4 | — | ≦1 | ≦1 | <0.5 | ND |
| High glutamate wastewater of high concentration | Influent | 6747 | ~1799 | 1500 | 1400 | <0.5 | ND |
| | Effluent | <300 | <100 | ≦10 | ≦3 | <0.5 | ND |

TABLE 29-continued

Treatment results using the method according to the invention

| Wastewater type | Influent/ Effluent | COD mg·L$^{-1}$ | BOD mg·L$^{-1}$ | TKN mg·L$^{-1}$ | $NH_4^+$—N mg·L$^{-1}$ | $NO_2^-$—N mg·L$^{-1}$ | $NO_3^-$—N mg·L$^{-1}$ |
|---|---|---|---|---|---|---|---|
| High glutamate wastewater of low concentration | Influent | 2250 | ~600 | 500 | 430 | <0.5 | ND |
|  | Effluent | <100 | <30 | ≦10 | ≦3 | <0.5 | ND |
| Coke wastewater | Influent[1] | ~321 | — | ~250 | ~250 | <0.5 | ND |
|  | Effluent | ~300 | — | <10 | ≦3 | <0.5 | ND |

Effluent from coke plant (COD = 628.4 mg·L$^{-1}$ $NH_4^+$—N = 330 mg·L$^{-1}$) treated with the activated-sludge method.

To further emphasize the advantages of this invention, we compared the anoxic short-cut denitrification methods in this invention and the aerobic simultaneous nitrification (SND) methods.

SND was carried out under aeration and continuous mixing. When $NH_3$—N was oxidized to $NO_2^-$—N and further accumulated to a certain amount (30~50 mg/L), carbon source (anhydrous NaAc) started to be added until the Griess-Ilosvay reagent test was negative ($NO_2^-$—N<0.5 mg/L) which demonstrated aerobic denitrification had been completed. The total carbon source consumption was calculated when the Griess-Ilosvay reagent test was positive ($NO_2^-$—N>0.5 mg/L) about 5~10 minutes later after the disappearance of nitrite. The time needed for aerobic denitrification was written down. The procedure was repeated until $NH_3$—N and $NO_2^-$—N fell below 3 mg/L and 0.5 mg/L, respectively. The reaction was stopped and total NaAc consumption and denitrification time was calculated.

The results of treating monosodium glutamate wastewater using two kinds of activated sludge with two kinds of methods were listed below.

Comparison of short-cut nitrification and denitrification in this invention and SND to treat monosodium glutamate wastewater ($NH_4^+$—N=500 mg/L) using activated sludge seeded from Wushantu (4000 mg/L) with single air diffuser was shown in Table 30.

TABLE 30

Comparison between short-cut nitrification/denitrification in this invention and SND for monosodium glutamate wastewater treatment
Activated sludge seeded from Wushantu, 28° C., single air diffuser

|  | Environment | Operation methods | Total $NO_2^-$N accumulation amount mg/L | Total NaAc consumption g | NaAc/$NO_2^-$N (w/w) | Accumulated short-cut denitrification time (hrs) | denitrification rate[1] mgN/min·L |
|---|---|---|---|---|---|---|---|
| This invention | Anoxic | Aeration stopped Mixing continued | 420 | 4.3 | 4.09 | 4.87 | 1.44 |
| SND | Aerobic | Aeration and mixing | 290 | 11.1 | 15.3 | 12.9 | 0.37 |

Denitrification rate = Total $NO_2^-$—N accumulation amount/accumulated short-cut denitrification time Comparison of short-cut nitrification and denitrification in this invention and SND to treat monosodium glutamate wastewater ($NH_4^+$—N=500 mg/L) using activated sludge seeded from Yutu (4000 mg/L) with single air diffuser was shown in Table 31.

TABLE 31

Comparison between short-cut nitrification/denitrification in this invention and SND for monosodium glutamate wastewater treatment
Activated sludge seeded from Yutu soil, 28° C., single air diffuser

|  | Environment | Operation methods | Total $NO_2^-$—N accumulation amount mg/L | Total NaAc consumption g | NaAc/$NO_2^-$—N (w/w) | Accumulated short-cut denitrification time (hrs) | denitrification rate[1] mgN/min·L |
|---|---|---|---|---|---|---|---|
| This invention | anoxic | Aeration stopped Mixing continued | 385 | 4.1 | 4.26 | 5.75 | 1.12 |
| SND | aerobic | Aeration and mixing | 310 | 9.5 | 12.26 | 3.62 | 1.43 |

Denitrification rate = Total $NO_2^-$—N accumulation amount/accumulated short-cut denitrification time Tables 30 and 31 indicated that when activated sludge seeded from Wushantu soil was used, the carbon source needed for denitrifying every unit of $NO_2^-$—N using SND aerobic denitrification method was 3.74 times that of the method according to the present invention and the denitrification rate of SND was 25.7% of that of the method according to the present invention. Whereas when activated sludge seeded from Yutu was used, carbon source used in SND was 2.88 times of that in the method according to the present invention and denitrification rate was comparable in both methods, and denitrification rate for both methods were significantly higher than that using the activated sludge seeded from Wushantu. The cause underlying the differences related to the microorganism species.

In general, compared with the method according to the present invention, SND required more carbon source, aeration and energy supply, and has slower reaction rate.

What is claimed is:

1. A method for removing contaminant of carbon and nitrogen from wastewater by using the heterotrophic ammonia oxidation bacteria (HAOB), comprising the following:
   (A) Cultivation of HAOB activated sludge: seeding natural soils containing HAOB into substrates containing organic carbon and nitrogen and/or inorganic ammonia nitrogen, and aerating in a reactor while keeping pH within the range of 6.5 and 8.5, wherein if the substrate contains ammonia nitrogen, organic carbon source is supplied in batches; stopping aeration when ammonia nitrogen concentration falls below 3 mg/L and $NO_2^-$—N accumulation reaches maximum amount, maintaining an anoxic environment, and adding organic carbon source to allow denitrification to take place until the total of $NO_2^-$—N and $NO_3^-$—N concentrations are less than 1 mg/L; and
   (B) Removal of carbon and nitrogen from wastewater: seeding the activated sludge produced from (A) into a biological treatment reactor containing wastewater comprising organic carbon and nitrogen and/or inorganic ammonia nitrogen, and aerating to allow the ammonia oxidation to take place, wherein if the wastewater does not contain organic carbon, additional organic carbon source is added into the reactor; and stopping aeration when nitrite has accumulated, maintaining an anoxic condition, and adding organic carbon source to allow denitrification to take place until no nitrite is present,
   wherein the HAOB are heterotrophic bacteria which are able to carry out ammonification, ammonia oxidation and denitrification (reduction of nitrite and nitrate), and which have the following features: ability to grow on PM plate and score positive when Griess-Ilosvay reagent is directly applied; ability to directly oxidize ammonia into $N_2$, $NO_2^-$ or $NO_3^-$ under aerobic conditions in presence of organic carbon source; and ability to remove nitrogen through denitrification with $NO_2^-$ and $NO_3^-$ as electron receptors and BOD as electron donor under either aerobic or anaerobic conditions.

2. The method according to claim 1, wherein highly active *Bacillus pseudofirmus* NH-2 (Accession No. CCTCC M203101) act as the dominating bacteria in the HAOB activated sludge.

3. The method according to claim 1, wherein highly active *Arthrobacter globiformis* WR-2 (Accession No. CCTCC M202043) act as the dominating bacteria in the HAOB activated sludge.

4. The method according to claim 1, wherein in (A) the cultivation of HAOB activated sludge is carried out at 20~40° C.

5. The method accordin to claim 1 wherein the N accumulation is in the range of 0.5~125 mg/L in the ammonia oxidation of (B).

6. The method according to claim 5, wherein in (B) the ammonia oxidation and denitrification are repeated until the contaminant of carbon and nitrogen are removed from wastewater.

7. The method according to claim 1, wherein in (B) the ammonia oxidation and denitrification are repeated until the contaminant of carbon and nitrogen are removed from wastewater.

8. The method according to claim 1, wherein removal of carbon and nitrogen from wastewater described in (B) is carried out at 6~40° C.

9. The method according to claim 1, wherein the biological treatment reactor used in (B) is a suspended reactor, biofilm reactor, a single sequencing batch reactor, or continuous flow reactor, or their combinations.

10. The method according to claim 1, wherein the HAOB activated sludge is retained completely in the biological treatment reactor.

11. The method according to claim 1, wherein the biological treatment reactor is able to spontaneously achieve sludge-water separation; the wastewater having been treated is directly discharged from the biological treatment reactor.

12. The method according to claim 1, wherein the ammonia oxidation product is controlled by controlling the amount of organic carbon source in the biological treatment reactor under aerobic conditions.

13. The method according to claim 12, wherein, for 1 mole of ammonia oxidized in the biological treatment reactor under aerobic conditions, when the oxidation energy produced by the organic carbon source is 22 KJ/mol, the molar ratio of $NO_2$—N to $NO_2^-$—N is 58:42; when the oxidation energy is less than 22 KJ/mol the molar percentage of $NO_2^-$—N is in the range of 42%~99% among the ammonia oxidation products; when the oxidation energy exceeds 22 KJ/mol, the molarpercentage of $NO_2$—N is in the range of 58%~99% among the ammonia oxidation products.

14. The method according to claim 13, wherein the ammonia oxidation in (B) is controlled at the stage in which no accumulation of $NO_3^-$—N occurs.

15. The method according to claim 14, wherein the oxidation energy of organic carbon source in the biological treatment reactor under aerobic conditions exceeds 43.4 KJ/mol per mole of ammonia.

16. The method according to claim 1, wherein the method can be used to treat coke wastewater.

* * * * *